US008256294B2

(12) United States Patent
Ishida

(10) Patent No.: US 8,256,294 B2
(45) Date of Patent: Sep. 4, 2012

(54) GRAMMAGE DETECTION SENSOR OF RECORDING MEDIUM AND IMAGE FORMING APPARATUS

(75) Inventor: Tsutomu Ishida, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 730 days.

(21) Appl. No.: 12/482,351

(22) Filed: Jun. 10, 2009

(65) Prior Publication Data

US 2009/0310981 A1 Dec. 17, 2009

(30) Foreign Application Priority Data

Jun. 13, 2008 (JP) ................................ 2008-155361
Apr. 28, 2009 (JP) ................................ 2009-109394

(51) Int. Cl.
*G01N 9/18* (2006.01)
*G01F 1/20* (2006.01)
*G03G 15/00* (2006.01)

(52) U.S. Cl. .......................... 73/596; 73/861.08; 399/45

(58) Field of Classification Search .................... 73/596, 73/861.08; 399/45, 46
See application file for complete search history.

(56) References Cited

U.S. PATENT DOCUMENTS 4,446,735 A 5/1984 Weilacher
5,621,173 A * 4/1997 Knorr ............................ 73/610
5,691,474 A * 11/1997 Gerz .............................. 73/580
6,407,964 B1 * 6/2002 Hornung et al. .............. 367/138
6,595,060 B2 * 7/2003 Wunderer et al. .............. 73/597
6,763,721 B2 * 7/2004 Wunderer et al. .............. 73/602
7,694,311 B2 * 4/2010 Amir et al. .................... 719/320
8,045,868 B2 * 10/2011 Kuramochi et al. ............ 399/45

FOREIGN PATENT DOCUMENTS

JP 57-132055 A 8/1982
JP 2001-351141 A 12/2001

* cited by examiner

*Primary Examiner* — J M Saint Surin

(74) *Attorney, Agent, or Firm* — Canon USA Inc. IP Division

(57) ABSTRACT

A grammage detection sensor which detects a grammage of a recording medium using an ultrasonic wave includes a transmitting unit configured to transmit the ultrasonic wave and a receiving unit including a first vibration member configured to receive the ultrasonic wave that is transmitted from the transmitting unit and passes through the recording medium. The receiving unit includes a guide member configured to guide the ultrasonic wave that passes through the recording medium to the first vibration member. A length from a surface of the first vibration member to a plane including an end plane of the guide member along a line that passes through a center of the first vibration member and is perpendicular to the first vibration member is approximately n times of one-half wavelength of the ultrasonic wave transmitted from the transmitting unit where n is an integer of one or greater.

15 Claims, 22 Drawing Sheets

GUIDE LENGTH
:1 WAVELENGTH

SYNTHESIZED WAVE

GUIDE LENGTH
:3/4 WAVELENGTH

SYNTHESIZED WAVE

INTERMEDIATE POINT BETWEEN SENSORS

ON THE TRANSMITTING SIDE FROM INTERMEDIATE POINT BETWEEN SENSORS

INTERMEDIATE POINT BETWEEN SENSORS

ON THE TRANSMITTING SIDE FROM INTEMEDIATE POINT BETWEEN SENSORS
ULTRASONIC WAVE TRAVELING ALONG PATH 1
ULTRASONIC WAVE TRAVELING ALONG PATH 2
ULTRASONIC WAVE TRAVELING ALONG PATH 3

GRAMMAGE DETECTION SENSOR OF RECORDING MEDIUM AND IMAGE FORMING APPARATUS

BACKGROUND OF THE INVENTION

1. Field of the Invention

The present invention relates to a technique for accurately detecting a grammage of a recording medium used in an image forming apparatus.

2. Description of the Related Art

Image forming apparatuses such as copiers or laser printers include a sensor for determining a type of a recording medium. A method which uses the sensor in determining a type of the recording medium and sets a transfer condition or a fixing condition according to a determination result has been discussed.

A method for detecting a thickness of a recording medium by detecting an amount of light transmitted through the recording medium has been discussed. Further, Japanese Patent Application Laid-Open No. 57-132055 discusses a method for detecting a grammage of a recording medium by emitting an ultrasonic wave. The method that uses the ultrasonic wave needs to consider a reflected ultrasonic wave which is emitted from an ultrasonic wave transmitting unit (hereinafter referred to as a transmitting unit) and reflected from a recording medium. Additionally, it is necessary to consider an influence of a reflected ultrasonic wave that is transmitted through the recording medium and reflected from an ultrasonic wave receiving unit (hereinafter referred to as a receiving unit) Further, it is necessary to consider an influence of an ultrasonic wave reflected from a member in the periphery of the transmitting unit or the receiving unit. The member is, for example, a conveyance roller or a conveyance guide for conveying the recording medium.

As a method for reducing the influence of such reflected waves, Japanese Patent Application Laid-Open No. 2001-351141 discusses a configuration in which a guide is arranged for each ultrasonic wave transmitting unit and ultrasonic wave receiving unit.

However, according to the configuration discussed in Japanese Patent Application Laid-Open No. 2001-351141 in which a guide is arranged for each ultrasonic wave transmitting unit and ultrasonic wave receiving unit, interference may occur between an ultrasonic wave that is emitted from the ultrasonic wave transmitting unit and a reflected ultrasonic wave that is reflected by the guide before the ultrasonic wave reaches the recording medium. Due to such interference, the ultrasonic wave which is output from the transmitting unit may be emitted to the recording medium in an attenuated or an unstable state.

Further, interference also may occur between the ultrasonic wave that transmitted through the recording medium and a reflected ultrasonic wave that is reflected by the guide of the receiving unit before the ultrasonic wave reaches the receiving unit. Due to such interference, the ultrasonic wave is emitted to the recording medium in the attenuated or the unstable state. If the ultrasonic wave is attenuated or unstable, the grammage detection accuracy is decreased.

SUMMARY OF THE INVENTION

The present invention is directed to a technique that enhances grammage detection accuracy by realizing stable emission of an ultrasonic wave to a recording medium so that stable output of the ultrasonic wave after passing through the recording medium can be obtained.

According to an aspect of the present invention, a grammage detection sensor which detects a grammage of a recording medium using an ultrasonic wave includes a transmitting unit configured to transmit the ultrasonic wave and a receiving unit including a first vibration member configured to receive the ultrasonic wave that is transmitted from the transmitting unit and passes through the recording medium. The receiving unit includes a guide member configured to guide the ultrasonic wave that passes through the recording medium to the first vibration member. A length from a surface of the first vibration member to a plane including an end plane of the guide member along a line that passes through a center of the first vibration member and is perpendicular to the first vibration member is approximately n times of one-half wavelength of the ultrasonic wave transmitted from the transmitting unit where n is an integer of one or greater.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
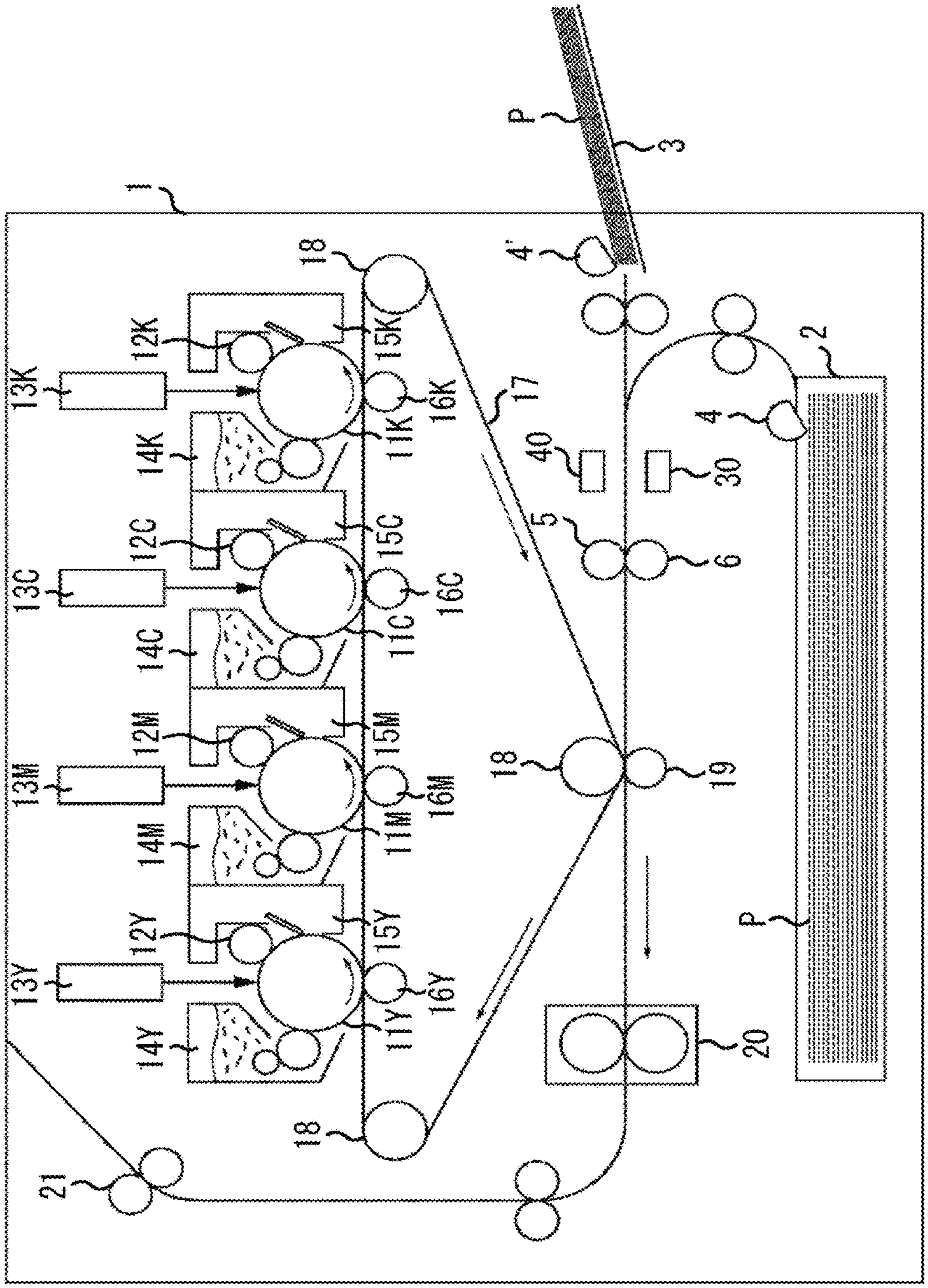
FIG. 1 is a schematic drawing of an image forming apparatus according to an exemplary embodiment of the present invention.

FIG. 1 illustrates a configuration of an image forming apparatus according to a first exemplary embodiment of the present invention. The image forming apparatus includes an intermediate transfer member and a plurality of image forming units that are arranged in tandem.

The image forming apparatus 1 illustrated in FIG. 1 includes a sheet cassette 2 and a paper feeding tray 3 that contain a recording medium P, and also a feeding roller 4 and a feeding roller 4' that pick up the recording medium P from the sheet cassette 2 and the paper feeding tray 3, respectively and feed the recording medium P to a conveyance path. Further, the image forming apparatus 1 includes photosensitive drums 11Y, 11M, 11C, and 11K for yellow, magenta, cyan, and black, respectively. Charge rollers 12Y, 12M, 12C, and 12K are provided as primary charging units for uniformly charging the photosensitive drums 11Y, 11M, 11C, and 11K to a predetermined potential.

The image forming apparatus 1 further includes optical units 13Y, 13M, 13C, and 13K that respectively irradiate the photosensitive drums 11Y, 11M, 11C, and 11K which are charged by the primary charging units with a laser beam corresponding to image data of each color. Then, an electrostatic latent image is formed on each photosensitive drum. Additionally, the image forming apparatus 1 includes development units (also called as cartridges) 14Y, 14M, 14C, and 14K that visualize the electrostatic latent image that is formed on each of the photosensitive drums 11Y, 11M, 11C, and 11K. The image forming apparatus 1 also includes development rollers 15Y, 15M, 15C, and 15K that convey the developer contained in the development units 14Y, 14M, 14C, and 14K to the photosensitive drums 11Y, 11M, 11C, and 11K, respectively.

Further, the image forming apparatus 1 includes an intermediate transfer belt 17 and primary transfer rollers 16Y, 16M, 16C, and 16K which primarily transfer the image formed on each of the photosensitive drums 11Y, 11M, 11C, and 11K onto the intermediate transfer belt 17. Additionally, the image forming apparatus 1 includes a drive roller 18 that drives the intermediate transfer belt 17, a secondary transfer roller 19 that transfers the image formed on the intermediate transfer belt 17 onto the recording medium P, and a fixing unit 20 that fixes a developer image transferred onto the recording medium P while the recording medium P is being conveyed.

Next, an operation of the image forming apparatus 1 will be described. When an image signal of an image to be printed is input in the image forming apparatus 1, the recording medium P is picked up from the sheet cassette 2 by the feeding roller 4 or from the paper feeding tray 3 by the feeding roller 4' and conveyed to the conveyance path. The recording medium P temporarily stops and waits at a position where a conveyance roller 5 and a conveyance counter roller 6 are provided so that the recording medium P can be conveyed in synchronization with an operation for forming the image on the intermediate transfer belt 17. At this time, as described above, a distance between the recording medium P and a transmitting unit 30 or a distance between the recording medium P and a receiving unit 40 changes.

Then, the recording medium P is conveyed in synchronization with the image forming operation, and a developer image that is formed on the intermediate transfer belt 17 is transferred onto the recording medium P. The developer image that is transferred onto the recording medium P is fixed by the fixing unit 20 such as a fixing roller. The recording medium P on which the developer image is fixed is discharged to a discharge tray (not shown) by a discharge roller 21, and the image forming operation ends.

Next, the image forming method for forming an image on the intermediate transfer belt 17 will be described. When an image signal of an image to be printed is input in the image forming apparatus 1, the photosensitive drums 11Y, 11M, 11C, and 11K are charged to a certain potential by the charge rollers 12Y, 12M, 12C, and 12K. According to the received image signal, each of the optical units 13Y, 13M, 13C, and 13K scans a surface of each of the charged photosensitive drums 11Y, 11M, 11C, and 11K with a laser beam to form a latent image. In order to visualize the electrostatic latent images, the images are developed by the development units 14Y, 14M, 14C, and 14K and the development rollers 15Y, 15M, 15C, and 15K.

The electrostatic latent images formed on the surface of the photosensitive drums 11Y, 11M, 11C, and 11K are respectively developed by the development units 14Y, 14M, 14C, and 14K as monochromatic developer images. The photosensitive drums 11Y, 11M, 11C, and 11K contact the intermediate transfer belt 17 and rotate in synchronization with rotation of the intermediate transfer belt 17. The developed monochromatic developer images are sequentially transferred onto the intermediate transfer belt 17 by the primary transfer rollers 16Y, 16M, 16C, and 16K, and a multicolor developer image is formed accordingly. The multicolor developer image is transferred onto the recording medium P.

A grammage detection sensor for detecting a grammage of the recording medium P included in the image forming apparatus 1 illustrated in FIG. 1 is arranged at a position upstream of the conveyance roller 5 and the conveyance counter roller 6 so that the transmitting unit 30 and the receiving unit 40 face each other across the conveyance path on which the recording medium P is conveyed. The grammage detection of the recording medium P is performed while the recording medium P is temporarily stopped at a position upstream of the conveyance roller 5 and the conveyance counter roller 6. The grammage is mass per unit area of the recording medium and is expressed in grams per square meter ($g/m^2$).

The image forming apparatus 1 controls image forming conditions according to an output result obtained from the grammage detection sensor. The image forming conditions are, for example, a conveyance speed of the recording medium P, a voltage that is applied to the secondary transfer roller 19 at the transfer operation, and a fixing temperature at the fixing operation. The image forming conditions are changed according to paper types.

The paper types are types of the recording medium used by the image forming apparatus 1 such as plain paper, thin paper, thick paper, and glossy paper. The image forming conditions described above are examples and other conditions can be used so long as the image forming conditions can be controlled using the output result of the grammage detection sensor.

Figure 2:
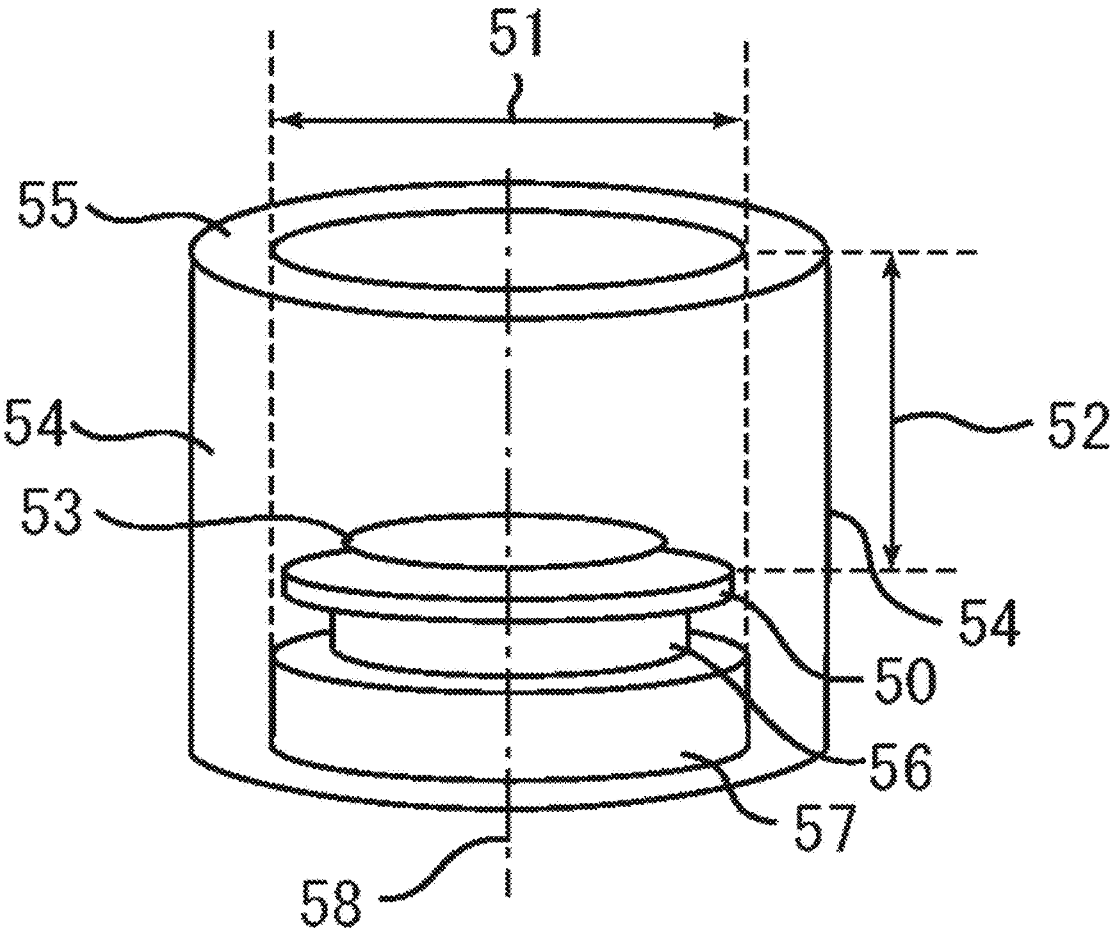
FIG. 2 illustrates a configuration of a grammage detection sensor.

FIG. 2 illustrates a configuration of the transmitting unit 30 and the receiving unit 40 of the grammage detection sensor. A vibration member 50 transmits or receives an ultrasonic wave when it vibrates. A guide 54 has an opening diameter 51 and a distance 52 between a surface of the vibration member 50 and a guide end plane 55. An equalizer 53 is a member for amplifying the ultrasonic wave transmitted from or received by the vibration member 50. If the vibration member 50 is provided, the ultrasonic wave can be transmitted or received without the equalizer 53. According to the present exemplary embodiment, the equalizer 53 is included in the grammage detection sensor so as to amplify the ultrasonic wave to be transmitted or received.

The grammage detection sensor is surrounded by the guide 54 having a cylindrical shape and the guide end plane 55. According to the present exemplary embodiment, a plane that includes the guide end plane 55 (i.e., an opening portion of the guide member) is defined as a virtual plane. A supporting member 56 supports the vibration member 50. A base member 57 is a base portion of the grammage detection sensor. The vibration member 50 vibrates while it is supported by the supporting member 56 and generates an ultrasonic wave. A line 58 is a virtual line that passes through a center of the vibration member 50 and is perpendicular to the vibration member 50. The line 58 is a reference line for uniquely determining the distance 52 from the surface of the vibration member 50 to the guide end plane 55 of the guide 54.

According to the present exemplary embodiment, the vibration member 50 which is included in the transmitting unit 30 and the receiving unit 40 is set parallel to the guide end plane 55. The distance 52, which is the distance from the surface of the vibration member 50 to the guide end plane 55, is defined as a guide length. An axis that passes through a center of the cylindrical-shaped vibration member 50 and is extended perpendicularly is defined as a central axis. The distance 52 is defined as equal to the distance between the surface of the vibration member 50 to the virtual plane along the central axis.

According to the present exemplary embodiment, the central axis is parallel to the guide member and the distance along the central axis is defined as the guide length. However, the guide is not necessarily parallel to the central axis if the grammage of the recording medium P can be uniquely detected from a calculation output as described below. Further, the guide length can be different at different portions of the guide 54 if the grammage of the recording medium P can be uniquely detected from the calculation output.

As illustrated in FIG. 2, by surrounding the vibration member 50 with the guide 54, the ultrasonic wave can be transmitted with directionality and an influence of a wave reflected from the peripheral members can be reduced. According to the present exemplary embodiment, the guide 54 is set so that the base member 57 of the vibration member 50 contacts an inner surface of the guide 54. However, if the grammage of the recording medium P can be uniquely detected from the calculation output, the guide 54 can be set so as not to contact the base member 57 of the vibration member 50.

The transmitting unit 30 and the receiving unit 40 can be configured using the vibration member 50 being a common member. For example, the transmitting unit 30 can emit an ultrasonic wave by vibrating the vibration member 50 which is vibrated by a piezoelectric element (not shown). Further, when the emitted ultrasonic wave reaches the vibration member 50 of the receiving unit 40, the vibration member 50 vibrates and the receiving unit 40 can receive the ultrasonic wave.

According to the present exemplary embodiment, the guide 54 is, for example, made of resin, and thus capable of blocking ultrasonic waves reflected from the members in the periphery of the transmitting unit 30 or the receiving unit 40. The material of the guide 54, however, is not limited to resin. The guide 54 can be made of a different material such as metal so long as an effect similar to the present exemplary embodiment can be achieved.

Figure 3:
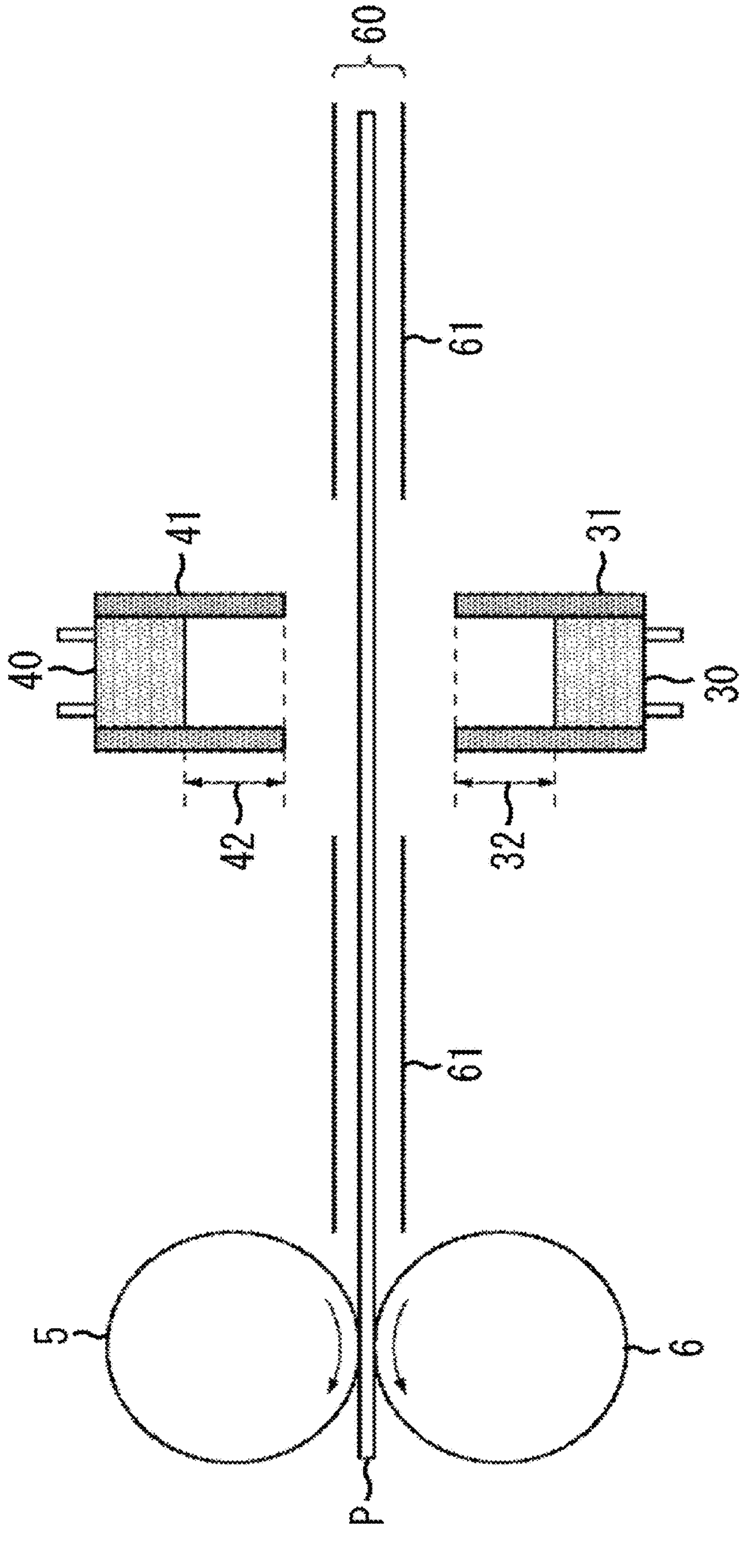
FIG. 3 illustrates a configuration of a grammage detection sensor for detecting a grammage of a recording medium according to a first exemplary embodiment of the present invention.

Next, a configuration of the grammage detection sensor according to the first exemplary embodiment will be described referring to FIG. 3. The grammage detection sensor configured to detect the grammage of the recording medium P includes the transmitting unit 30 for emitting an ultrasonic wave to the recording medium P and the receiving unit 40 for receiving the ultrasonic wave emitted from the transmitting unit 30. The transmitting unit 30 and the receiving unit 40 include the ultrasonic sensor that is described referring to FIG. 2.

Additionally, the grammage detection sensor includes a guide member 31 (hereinafter referred to as a transmitting-side guide member 31) that guides the ultrasonic wave emitted from the transmitting unit 30 in the direction of the receiving unit 40 that faces the transmitting unit 30. Further, the grammage detection sensor includes a guide member 41 (hereinafter referred to as a receiving-side guide member 41) that guides the ultrasonic wave that transmitted through the recording medium P in the direction of the receiving unit 40 and prevents interference from the ultrasonic waves reflected from the members in the periphery of the receiving unit 40. Furthermore, the conveyance roller 5, the conveyance counter roller 6, a conveyance path 60, and a conveyance guide 61, which are used for conveying the recording medium P, are provided in the periphery of the grammage detection sensor. The conveyance path 60 includes the conveyance guide 61.

A distance from the vibration member 50 of the transmitting unit 30 to the guide end plane is defined as a guide length 32 of the transmitting unit. A distance from the vibration member 50 of the receiving unit 40 to the guide end plane is defined as a guide length 42 of the receiving unit. The lengths of the guide length 32 and the length of the guide length 42 are equal to the distance 52 illustrated in FIG. 2, which is a distance from the surface of the vibration member 50 to the guide end plane 55.

Figure 4:
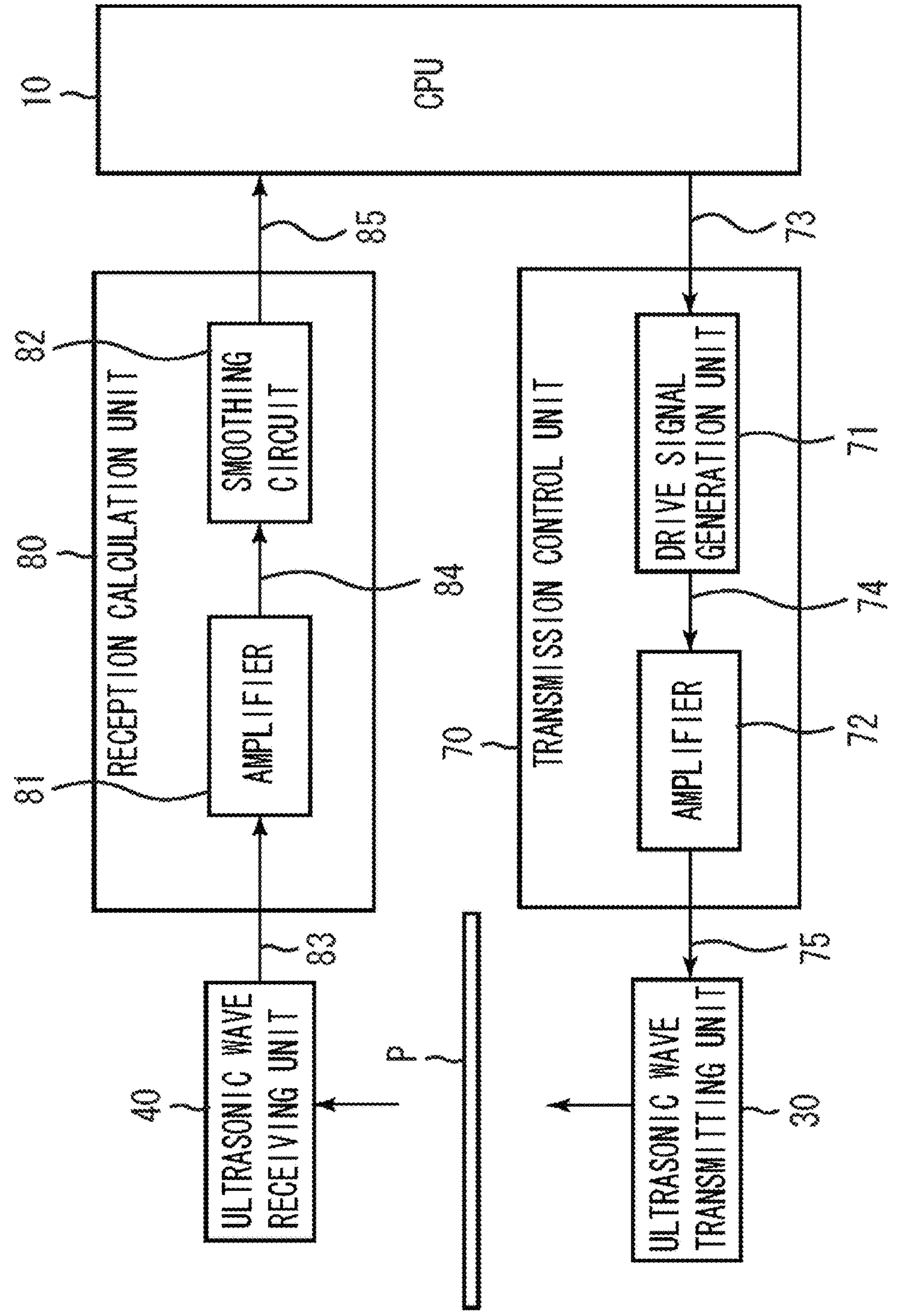
FIG. 4 is a block diagram illustrating a configuration of a control unit of the grammage detection sensor according to the first exemplary embodiment of the present invention.
Figures 5A, 5B, 5C:
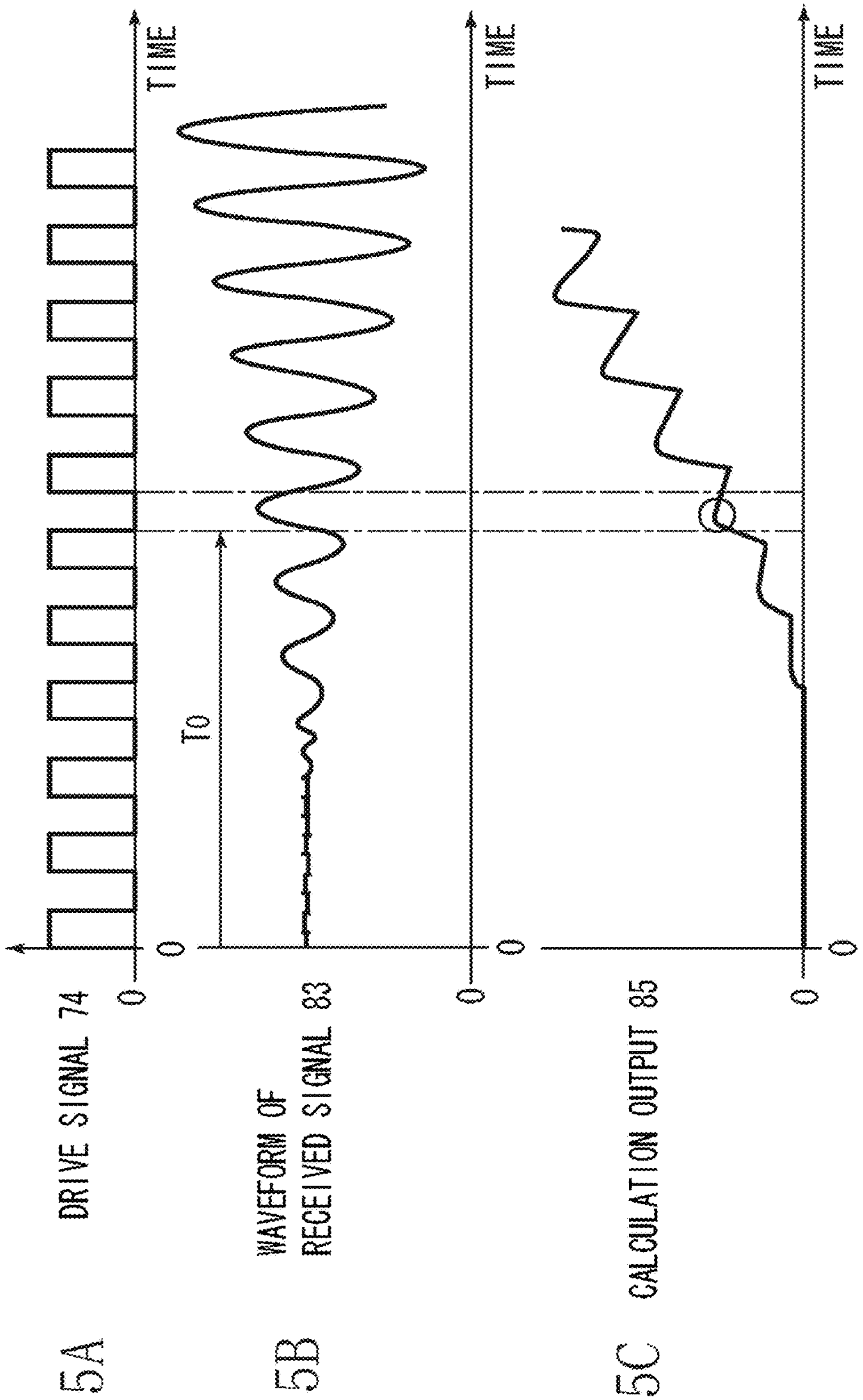
FIGS. 5A to 5C illustrate examples of a waveform used in the grammage detection sensor according to the first exemplary embodiment of the present invention.

Next, a method for controlling the detection of a grammage according to the image forming apparatus 1 illustrated in FIG. 1 will be described referring to the block diagram in FIG. 4. Further, examples of a drive signal for vibrating the piezoelectric element, a typical waveform of the received ultrasonic wave, and a waveform of a calculation output for detecting the grammage based on the waveform of the received ultrasonic wave are illustrated in FIGS. 5A, 5B, and 5C, respectively.

The transmitting unit 30 and the receiving unit 40 of the grammage detection sensor are arranged at predetermined positions with the conveyance path 60 in between, and detect the grammage of the recording medium P conveyed through the conveyance path 60. Since the ultrasonic wave transmitting unit 30 and the ultrasonic wave receiving unit 40 in FIG. 4 are the same as the transmitting unit 30 and the receiving unit 40 illustrated in FIG. 3, they are denoted with the same numerals.

Next, a method for detecting the grammage will be described. First, a central processing unit (CPU) 10 transmits an ultrasonic wave transmission signal 73 to a transmission control unit 70. The transmission control unit 70 includes a drive signal generation unit 71 and an amplifier 72. The ultrasonic wave transmission signal 73 includes information about timing for driving the transmitting unit 30 and frequency information.

The drive signal generation unit 71 included in the transmission control unit 70 generates a drive signal 74 of a specified frequency (e.g., 40 kHz) based on the ultrasonic wave transmission signal 73, and outputs the generated signal. The drive signal 74 is illustrated in FIG. 5A. The drive signal 74 of 40 kHz drives the piezoelectric element which vibrates the vibration member 50 to generate an ultrasonic wave. The amplifier 72 amplifies a signal level of the drive signal 74 and an amplified drive signal 75 is sent to the transmitting unit 30. According to the drive signal 75, the transmitting unit 30 outputs an ultrasonic wave of 40 kHz.

The receiving unit 40 receives the ultrasonic wave that has been sent from the transmitting unit 30 and passed through the recording medium P, and outputs a received signal 83 of the ultrasonic wave to a calculation unit 80. The waveform of the received signal 83 is illustrated in FIG. 5B. As can be seen from FIG. 5B, an output value of the received signal 83 increases as time passes. Although the output value of the ultrasonic wave increases as time passes, the possibility of receiving the influence of the reflected wave also increases.

Thus, according to the present exemplary embodiment, in order to receive the ultrasonic wave as fast as possible and to obtain an output value that is sufficient for detecting the grammage, the grammage is detected using a value at timing where an output value of a certain level is obtained. This timing is a time T0 in FIG. 5B. The time T0 will be described below in detail. Further, although not shown, when a predetermined time passes, the received waveform stabilizes and a certain output is obtained.

The calculation unit 80 includes an amplifier 81, a smoothing circuit 82, and a rectifying circuit (not illustrated). The received signal 83 received by the calculation unit 80 is amplified by the amplifier 81. A signal 84 amplified by the amplifier 81 is rectified by the rectifying circuit and then is integrated by the smoothing circuit 82, and a calculation output 85 is generated accordingly. The waveform of the calculation output 85 is illustrated in FIG. 5C. The calculation output 85 increases in proportion to the output of the received signal 83. When a sufficient amount of the calculation output 85 is obtained, the obtained calculation output is output to the CPU 10. The CPU 10 determines the grammage of the recording medium P using the calculation output. Similar to the received signal 83, when a certain time passes, the received waveform stabilizes and a certain output is obtained.

The CPU 10 starts sampling the waveform when a certain time passes after the drive signal 75 is output to the transmitting unit 30. Here, the certain time is the time T0 in FIG. 5C at which the calculation output 85 exceeds a predetermined threshold value of the calculation output 85. The threshold value of the calculation output 85 can be determined arbitrarily, and can be set to a value lower than the calculation output result of the grammage. For example, if the guide length and the threshold value are determined as one wavelength and 0.5 V respectively, then a grammage that corresponds to the calculation output of 0.5 V or greater can be determined (see FIG. 6).

Under the above-described conditions of the present exemplary embodiment, a grammage of 60 to 220 g/m$^2$ can be determined. Although the time T0 is set to 150 μs according to the present exemplary embodiment, since this value varies depending on the above-described threshold value of the calculation output, the time T0 is not limited to 150 μs. After the time T0, a maximum value in a half cycle of the input frequency (the waveform that is circled in FIG. 5C) is calculated. The grammage is detected using this calculation output value. FIGS. 4 and 5A to 5C illustrate examples of the configuration and control of the grammage detection sensor, and the present invention is not limited to the above-described configuration.

Figure 6:
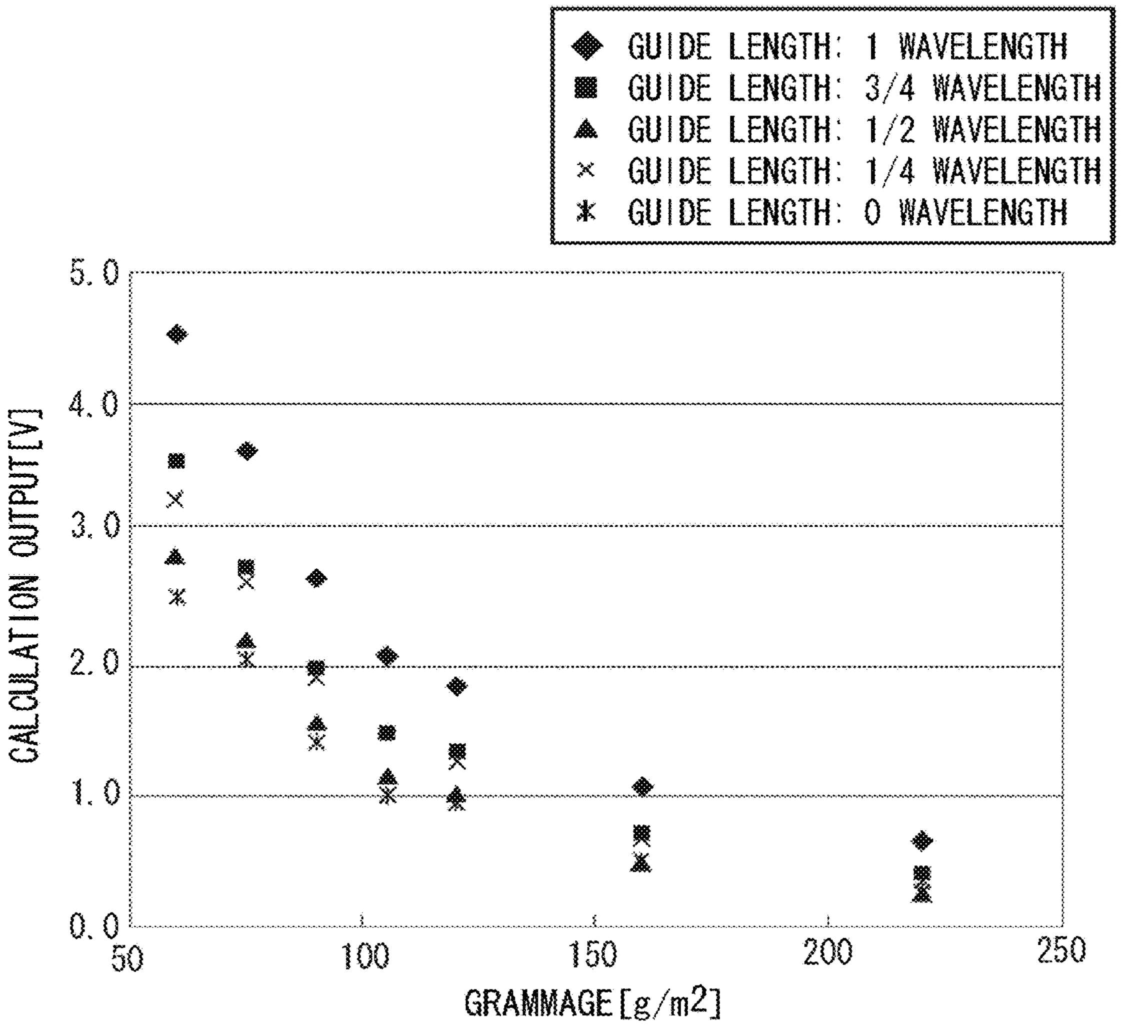
FIG. 6 illustrates a relation between a grammage of a recording medium and a calculation output when the grammage detection sensor includes or does not include a guide member and when a length of the guide member is changed.

FIG. 6 illustrates results of the calculation performed by the calculation unit 80 when the paper type (grammage) of the recording medium P is changed in cases where the guide is used and not used. The guide lengths used in this calculation are one-fourth, one-half, three-fourth, and one wavelength of the ultrasonic wave that is transmitted. In FIG. 6, the X-axis in the graph represents the grammage of the recording medium P and the Y-axis represents the output of the calculation unit 80. A driving frequency of the transmitting unit 30 according to the present exemplary embodiment is 40 kHz. Although the driving frequency is set at 40 kHz, the frequency is not limited to 40 kHz. For example, if a size of the vibration member 50 or another member of the sensor illustrated in FIG. 2 is changed, the frequency can be set according to the changed configuration.

Figure 7:
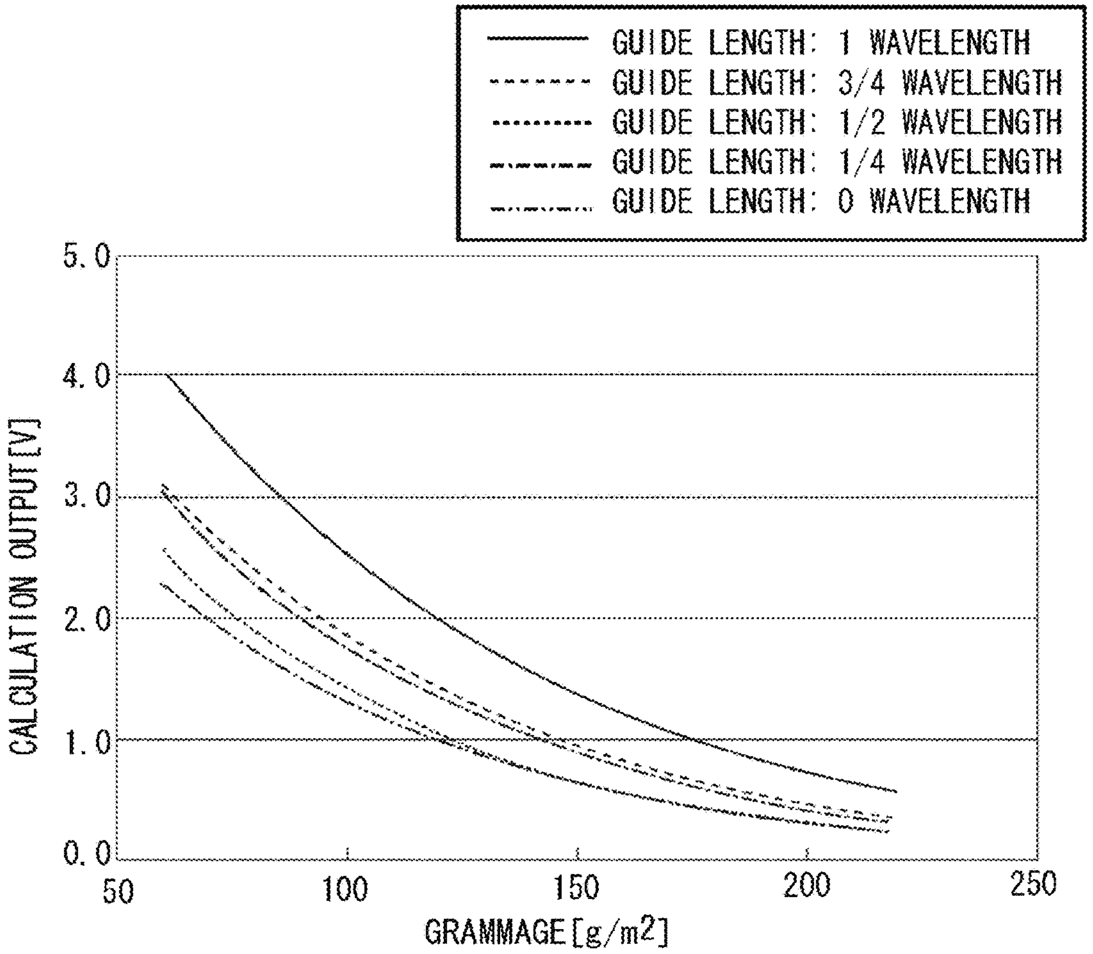
FIG. 7 is a line graph obtained by plotting the points illustrated in FIG. 6.

FIG. 7 illustrates a relation between the calculation output of each guide length and the grammage by connecting the plotted points in the graph in FIG. 6. The display methods of FIGS. 6 and 7 are different but they present the same calculation results.

Based on the calculation results in FIG. 6, a case where the guide is used (guide length: one wavelength) and a case where the guide is not used (guide length: 0 wavelength) are compared. For example, comparing the calculation outputs where the grammage is 105 g/m$^2$, the calculation output is approximately 2.1 V when the guide length is one wavelength, however the calculation result is approximately 1.0 V when the guide length is 0 wavelength. According to this result, it is understood that the calculation output has increased approximately twice.

Next, a difference between output values concerning different grammages is compared. For example, a difference in the calculation output when the grammages are 105 g/m$^2$ and 120 g/m$^2$ is compared. When the guide is one wavelength long, the calculation output is approximately 2.1 V when the grammage is 105 g/m$^2$ and approximately 1.8 V when the grammage is 120 g/m$^2$. Thus, the output difference is approximately 0.3 V. On the other hand, when the guide is zero wavelength long (i.e., the guide is not used), the calculation output is approximately 1.0 V when the grammage is 105 g/m$^2$ and approximately 0.9 V when the grammage is 120 g/m$^2$. Thus, the output difference is only approximately 0.1 V.

When the guide is used, the output difference between the calculation outputs concerning each grammage is increased. Even when paper of a heavier grammage is measured, if the guide is used, an amount of change of the output values is increased and the grammage is easier to be identified. On the other hand, if the guide is not used, when paper of a heavier grammage is measured, the amount of change of the output values is decreased and thus the grammage is difficult to be identified. Thus, by providing a guide member, the grammage detection accuracy of the recording medium can be improved.

As described above, the output can be increased by using the guide. However, in detecting a grammage of a recording medium using the image forming apparatus 1, an orientation of the recording medium P when it is stopped (a stop orientation) varies depending on such conditions as paper quality, temperature, and humidity. If the stop orientation of the storage medium P varies, the distance between the transmitting unit 30 and the recording medium P and the distance between the recording medium P and the receiving unit 40 change, which will cause unstable output.

Figure 8:
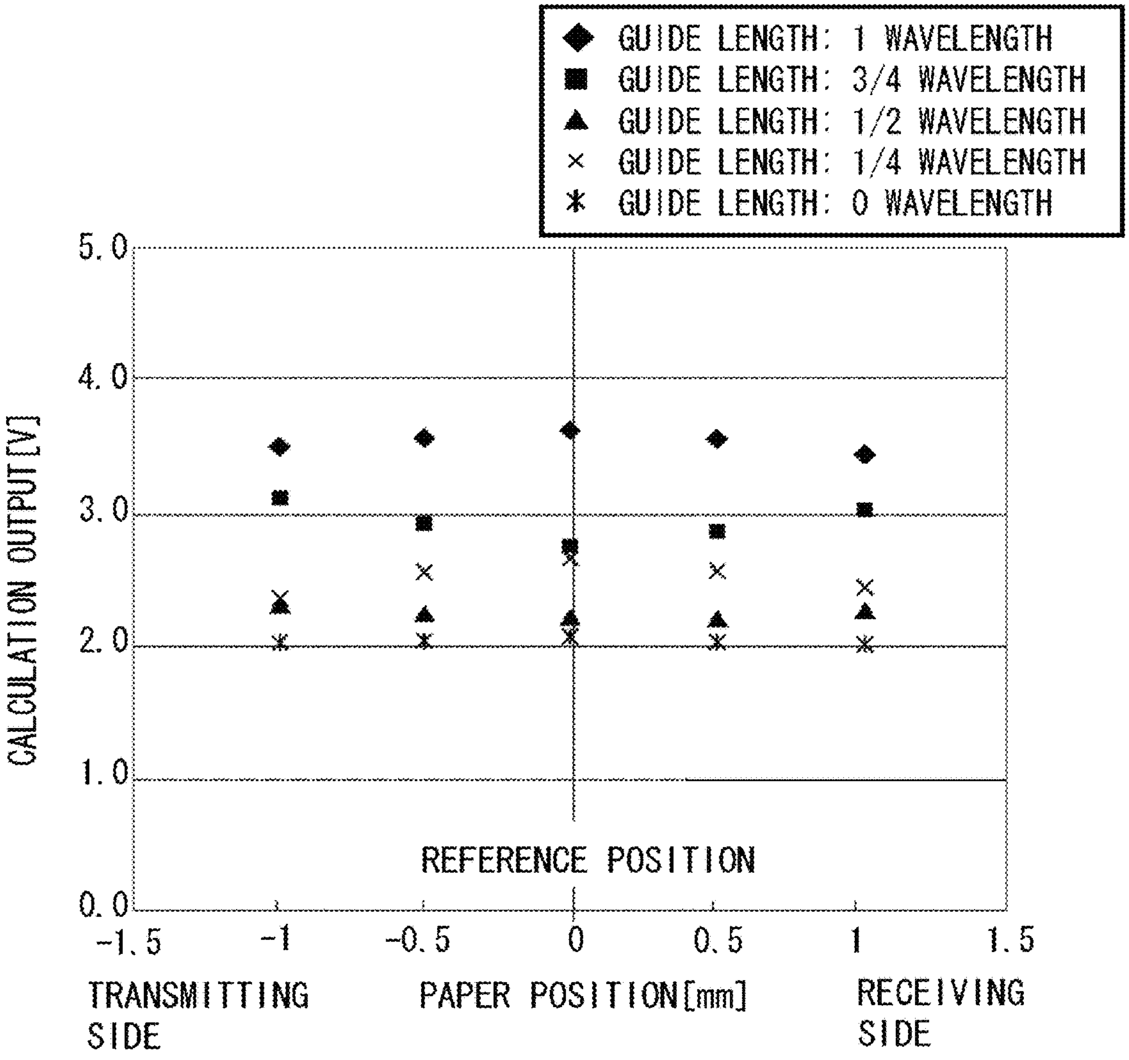
FIG. 8 illustrates a relation between a stop orientation of a recording medium and a calculation output when a length of the guide member of the grammage detection sensor is changed.

FIG. 8 illustrates a relation of the recording medium P and the guide. In FIG. 8, the guide length 32 of the transmitting-side guide member 31 and the guide length 42 of the receiving-side guide member 41 are changed while the guide end planes of the transmitting unit 30 and the receiving unit 40 are in fixed positions, and then the stop orientation of the recording medium P is changed to determine whether any difference occurs in the calculation output. The guide lengths 32 and 42 are determined based on the wavelength of the ultrasonic wave that is transmitted. Here, the guides with a guide length of one-quarter, one-half, three-quarter, and one wavelength as well as 0 wavelength (i.e., no guide) of the ultrasonic wave to be transmitted are used. The paper type (grammage) of the recording medium P is 75 g/m$^2$. The calculation output of the calculation unit 80 is measured using the above-described guides and the recording medium P.

In FIG. 8, the X-axis in the graph represents the position of the recording medium P with respect to the transmitting unit 30 or the receiving unit 40, and the Y-axis represents the calculation output of the calculation unit 80. Similar to the above-described calculation, the driving frequency of the transmitting unit 30 is 40 kHz. By changing the distance between the recording medium P and the transmitting unit 30 and the distance between the recording medium P and the receiving unit 40, the stop orientation of the recording medium P is changed, and the calculation output is measured when the recording medium P is in different stop orientations. More particularly, the middle point of the guide end plane of the transmitting unit 30 and the guide end plane of the receiving unit 40 is set as a reference position (i.e., difference is 0 mm) of the recording medium P in the stop orientation, and if the position of the recording medium P is moved to the receiving side, its position on the graph moves in the positive direction. From the graph in FIG. 8, the variation of the calculation outputs according to the influence of the position of the recording medium P is extremely small when the guide is not used, so that the calculation output value of the receiving unit 40 is stable. However, if the guides are not used, the obtained calculation outputs are small.

On the other hand, when the guides are used, the calculation output value increases when the guide length 32 and the guide length 42 are longer. However, although the calculation output value increases when the guides having longer guide length are used, if the guide length is three-quarter wavelength, the variation of the calculation output also increases, and a maximum variation is approximately 0.4 V. If this result is applied to the calculation result that is illustrated in FIG. 7, grammages of 75 to 105 g/m$^2$ can be included in the result of the determination. Thus, it is difficult to determine that the paper has the grammage of 75 g/m$^2$. However, if the guide length is one-half wavelength or one wavelength, the variation of the calculation output is stable and within the range of 0.2 V. Accordingly, the paper can be determined that it has the grammage of 75 g/m$^2$.

From this result, it can be understood that using the guide is helpful in increasing the calculation output, but the output becomes unstable depending on the guide length and the position of the recording medium P. Further, it can be understood that when the guide lengths 32 and 42 are one-half wavelength or one wavelength, the calculation output is stable even if the position of the recording medium P varies. Thus, by setting the guide length to n times of one-half wavelength of the ultrasonic wave (n is an integer of one or greater, hereinafter referred to as an integral multiple) such as one-half wavelength or one wavelength, the output of the ultrasonic wave can be stable and the grammage detection accuracy can be improved.

The conditions for emitting the ultrasonic wave such as temperature and humidity are not always constant. According to the present exemplary embodiment, the calculation is performed under the conditions of temperature of 23° C. and the frequency of 40 kHz, however, due to a change in the conditions such as temperature and humidity, the set guide length may not always be the optimum length when the grammage detection is actually performed in the image forming apparatus.

Ideally, the optimum guide length is an integral multiple of one-half wavelength of the ultrasonic wave. However, since the environmental conditions under which the image forming apparatus is used vary, a speed and a wavelength of the ultrasonic wave change. For example, even if the guide length is set to an integral multiple of one-half wavelength of an ultrasonic wave under a certain condition, if the wavelength of the ultrasonic wave is changed, the set guide length may not be actually equal to the integral multiple of one-half wavelength of the ultrasonic wave.

Figure 9:
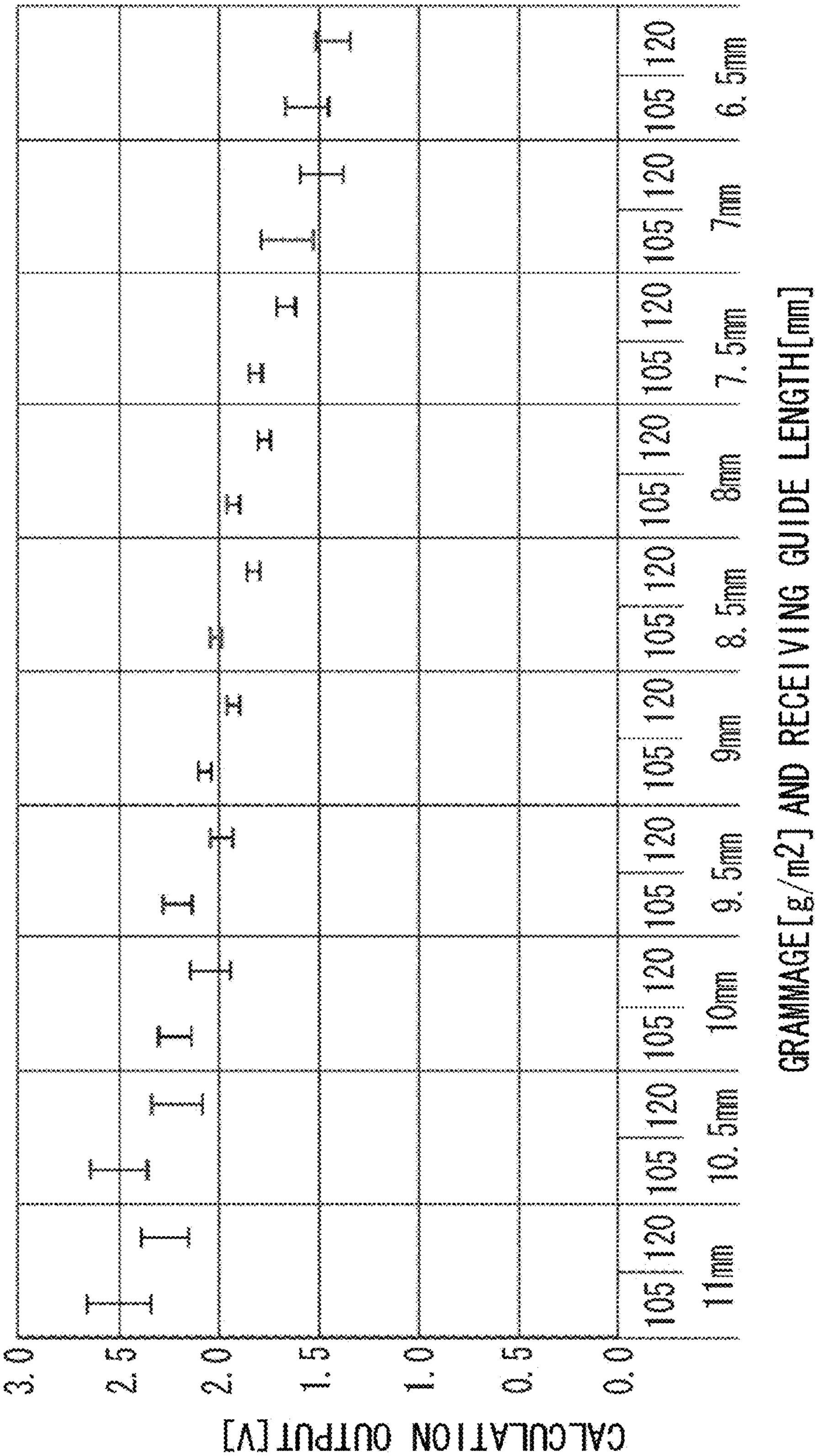
FIG. 9 illustrates a range of a calculation output that can uniquely determine the grammage in a certain condition.

Thus, under the conditions of temperature of 23° C. and the frequency of 40 kHz, the guide length is gradually changed from the integral multiple of one-half wavelength to determine at what point the grammage detection is not correctly performed. The result of this calculation is illustrated in FIG. 9. In FIG. 9, the guide length 42 on the receiving side is changed from 11 mm to 6.5 mm in performing the grammage detection. The paper type having a grammage of 105 g/m$^2$ is referred to as a recording medium of a first grammage and the paper type having a grammage of 120 g/m$^2$ is referred to as a recording medium of a second grammage out of the recording mediums plotted in FIG. 6, and the guide length of the guides is changed in performing the grammage detection.

A method for obtaining a theoretically optimum guide length will be described. A wavelength of an ultrasonic wave can be determined based on the speed and the frequency of the ultrasonic wave. Where v is the speed of an ultrasonic wave, f is the frequency, and $\lambda$ is the wavelength, the speed of the ultrasonic wave can be expressed by $v=f\lambda$. The speed of the ultrasonic wave changes depending on the temperature of the medium. According to the present exemplary embodiment, the medium is air, and the speed of the sound in the air can be expressed by v=331.5+0.61 t, where t represents the temperature of the air.

By applying these equations to the conditions of the present exemplary embodiment, since the frequency is 40 kHz and the temperature is 23° C., the optimum guide length can be calculated by the equations below.

$$v=331.5+(0.61\times 23)=345.53\ (\text{m/s})$$

$$\lambda=v/f=345.53/40=8.63825\ (\text{mm})$$

Thus, the optimum guide length will be ½×8.63825×n (n is an integer of one or greater).

However, as described above, since v and λ of the above-described equations change according to change in the environmental conditions such as temperature, a guide length set under a certain condition may not always be equal to the integral multiple of one-half wavelength of the ultrasonic wave. Under the conditions of the present exemplary embodiment, a guide length of 8.5 mm is set as a guide length that is closest to the approximate value of the integral multiple of one-half wavelength of the ultrasonic wave. The graph in FIG. 9 illustrates the results of the calculation when the guide lengths are changed from 6.5 mm to 11 mm, with 8.5 mm as the central value.

Next, whether the paper having the grammage of 105 g/m$^2$ and the paper having the grammage of 120 g/m$^2$ can be determined when the guide length is increased or decreased in steps of 0.5 mm from 8.5 mm will be described referring to FIG. 9. First, a case where the guide length is 8.5 mm will be described. When the recording medium having the grammage of 105 g/m$^2$ is detected, the calculation output is within the range of 1.98 V to 2.03 V. When the recording medium having the grammage of 120 g/m$^2$ is detected, the calculation output is within the range of 1.79 V to 1.85 V. The range of the calculation output of the recording medium having the grammage of 105 g/m$^2$ does not overlap with the range of the calculation output of the recording medium having the grammage of 120 g/m$^2$, and thus the grammage can be uniquely determined by the calculation output.

At this time, a mean value of the minimum value of the calculation output of the recording medium having the grammage of 105 g/m$^2$ and the maximum value of the calculation output of the recording medium having the grammage of 120 g/m$^2$ will be used as a threshold value in determining the grammage. Since the minimum value is 1.98 V and the maximum value is 1.85 V, the threshold value will be 1.915 V. Similarly, threshold values of the recording mediums having different grammages not illustrated in the graph are obtained. If the threshold values are obtained, then the grammage of the recording medium can be determined from which range of the threshold values the calculation output falls in.

As described above, in order to obtain the threshold values, it is necessary that the ranges of the calculation output of the recording mediums to be compared do not overlap. As seen from FIG. 9, the guide lengths that satisfy such a condition are from 7.5 mm to 9.5 mm. In other words, according to the present exemplary embodiment under the conditions of temperature of 23° C. and the frequency of 40 kHz, the grammage is uniquely determined when the guide length is 8.5 mm±1 mm. Thus, the appropriate guide length is approximately n times (n is an integer of one or greater) of one-half wavelength of the ultrasonic wave. However, this is an example according to the present exemplary embodiment and if the environmental conditions are changed or accuracy conditions for detecting the grammage that are set in advance are changed, the range of the appropriate guide length will be changed accordingly.

Next, a reason why setting the guide length to an integral multiple of one-half wavelength of the ultrasonic wave is effective in obtaining a stable output result will be described referring to FIGS. 10A, 10B, 11A, and 11B. The reason for the stable calculation output is resonance of the vibration of the ultrasonic wave that propagates in the guide member with the vibration of the air in the guide member having the opening end. If the ultrasonic wave that is transmitted from the transmitting unit 30 resonates with the vibration of the air in the guide member, interference of the sound wave in the guide will be extremely small. The frequency of the reflected wave changes according to the guide length, and if the guide length is an integral multiple of one-half wavelength of the ultrasonic wave, a reflected wave that resonates with the vibration of the air in the guide is generated.

Figure 10A:
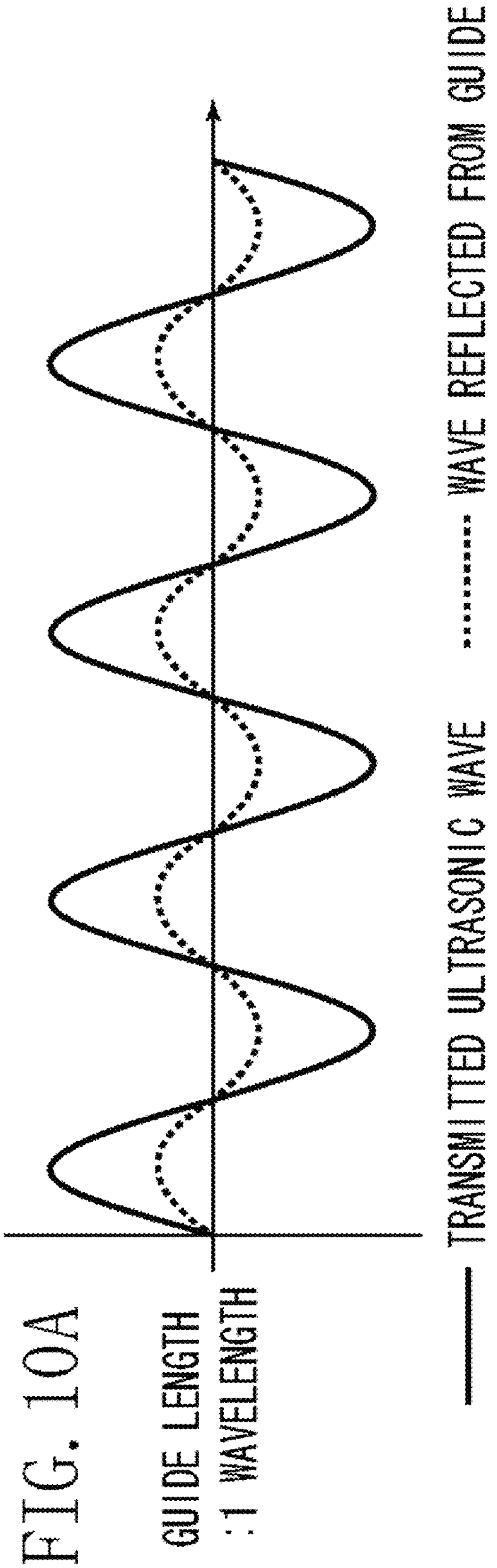
FIGS. 10A and 10B illustrate a relation between an ultrasonic wave and a guide-reflected wave when a guide length is set to one wavelength.
Figure 10B:
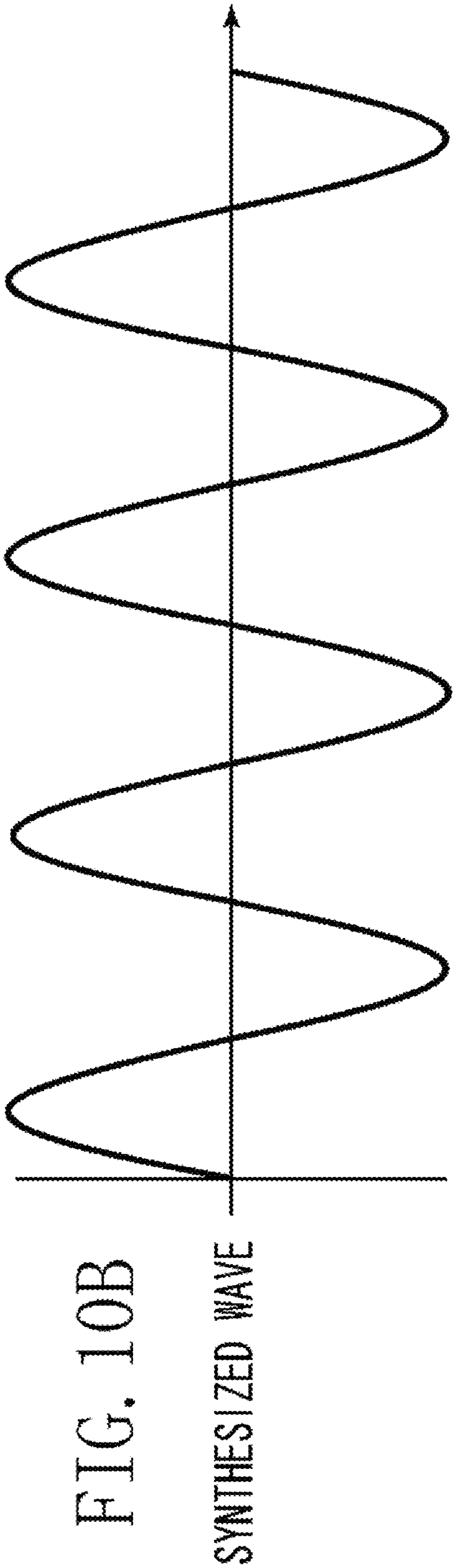

First, a case where the guide length is one wavelength (approximately 8.5 mm) at a frequency of 40 kHz will be described. FIGS. 10A and 10B illustrate a relation between an ultrasonic wave and a guide-reflected wave when the guide length is set to one wavelength. The frequency of the reflected wave is 40 kHz. In FIG. 10A, a solid line represents a waveform of the ultrasonic wave transmitted from the transmitting unit 30 and a dotted line represents a waveform of the wave reflected from the guide member. FIG. 10B illustrates a waveform of a synthesized sound wave of the above-described ultrasonic wave and reflected wave. Since the ultrasonic wave emitted from the transmitting unit 30 is in phase with the guide-reflected wave, the synthesized sound wave is amplified and stable.

Figures 11A, 11B:
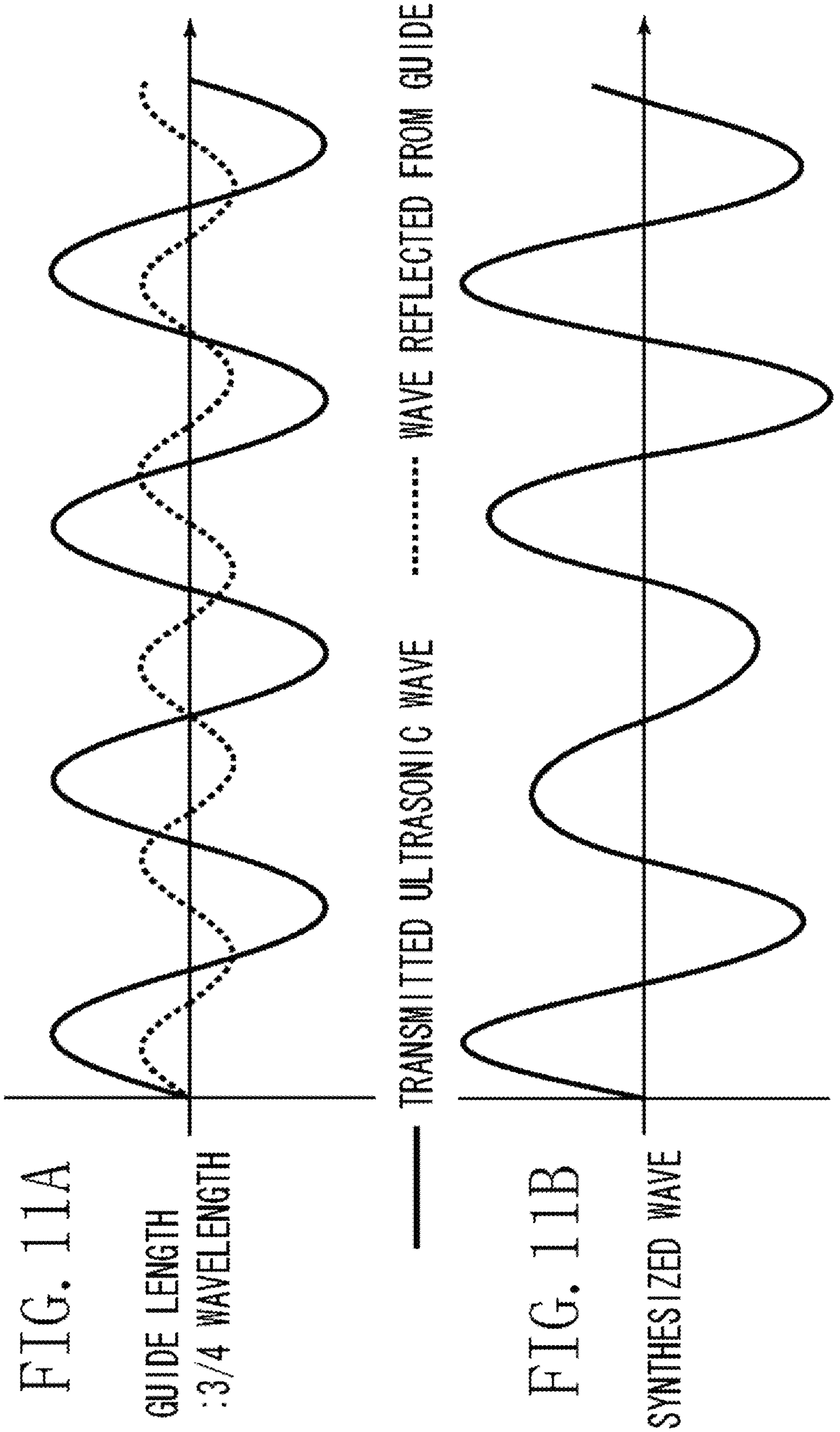
FIGS. 11A and 11B illustrate a relation between an ultrasonic wave and a guide-reflected wave when a guide length is set to three-quarter wavelength.

Next, a case where the guide length is three-quarter wavelength (approximately 6.3 mm) at a frequency of 40 kHz will be described. FIGS. 11A and 11B illustrate a relation between an ultrasonic wave and a guide-reflected wave when the guide length is set to three-quarter wavelength. The frequency of the reflected wave is 53 kHz. In FIG. 11A, a solid line represents a waveform of the ultrasonic wave emitted from the transmitting unit 30 and a dotted line represents a waveform of the wave reflected from the guide member. FIG. 11B illustrates a waveform of a synthesized sound wave of the above-described ultrasonic wave and reflected wave. Since the ultrasonic wave emitted from the transmitting unit 30 is 40 kHz and the reflected wave is 53 kHz, these two waves are not in phase. Thus the waveform of the synthesized sound wave illustrated in FIG. 11B is unstable due to interference of the reflected wave with the ultrasonic wave.

As described above, by setting the guide length to an integral multiple of one-half wavelength of the ultrasonic wave, the ultrasonic wave will be in phase with the guide-reflected wave, and a stable output of the ultrasonic wave can be obtained.

According to the results above, by setting the guide length 32 of the transmitting-side guide member 31 and the guide length 42 of the receiving-side guide member 41 to an integral multiple of one-half wavelength of the ultrasonic wave that is emitted from the transmitting unit 30, a stable output of the ultrasonic wave can be realized, and the grammage detection accuracy can be improved. In other words, the grammage detection accuracy can be improved if the guide length is within a certain range of the ideal guide length which is an integral multiple of one-half wavelength of the ultrasonic wave. For example, as illustrated in FIG. 9, if the guide length is set within a certain range so that the result of the calculation output does not overlap the calculation output of a different recording medium having a different grammage, the grammage can be accurately identified.

Further, according to the present exemplary embodiment, an operation of the grammage detection sensor is performed when the recording medium P is stopped, however the detection can also be performed when the recording medium P is being conveyed. If the detection is performed while the recording medium P is being conveyed, since a state of the recording medium P is assumed to vary due to conveyance, the detection is performed, for example, a plurality of times, or the conveyance speed is reduced so as to maintain the detection accuracy.

Further, according to the present exemplary embodiment, guide members are arranged on the transmitting unit 30 and on the receiving unit 40, however the guide member can be arranged only on the receiving unit 40. If the guide member is arranged at least on the receiving unit 40, the ultrasonic wave that transmits through the recording medium P can be guided to the receiving unit 40 in a stable manner.

A second exemplary embodiment of the present invention will be described. Since the configuration of the grammage detection sensor according to the present exemplary embodiment is similar to that of the first exemplary embodiment described above referring to FIGS. 2 and 3, detailed description of the configuration is omitted. According to the present exemplary embodiment, the detection is performed at temperature of 23° C. and the guide length 32 of the transmitting-side guide member 31 is set to be an integral multiple of one-half wavelength of the ultrasonic wave emitted from the transmitting unit 30. Similarly, the guide length 42 of the receiving-side guide member 41 is set at an integral multiple of one-half wavelength of the ultrasonic wave emitted from the transmitting unit 30.

Figure 12:
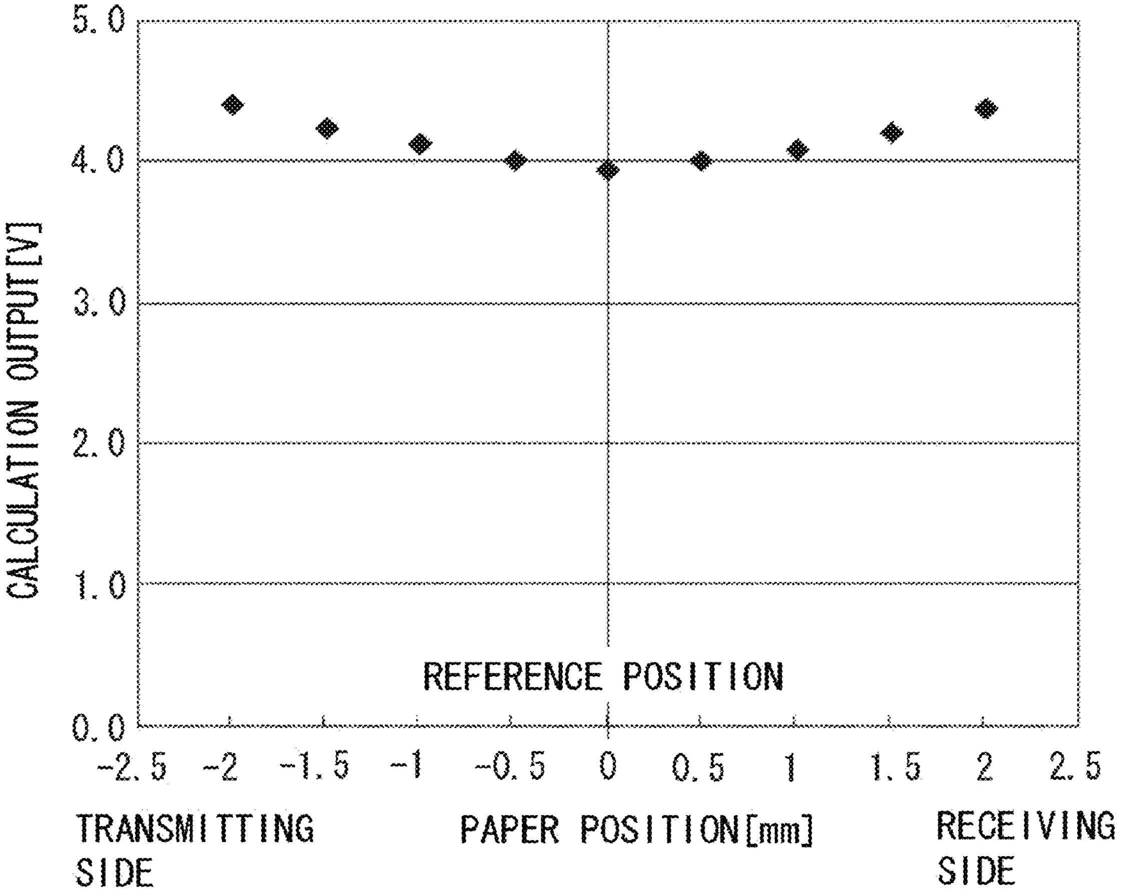
FIG. 12 illustrates changes in a calculation output when a distance between the guides of the grammage detection sensor is fixed and a position of the recording medium is changed.

Under the above-described conditions, the distance between the guide end planes of the transmitting unit 30 and the receiving unit 40 is set at 5 mm, and the stop orientation of the recording medium P is changed. The result of the calculation output is shown in FIG. 12. Since the detection conditions are similar to those described according to the first exemplary embodiment referring to FIG. 8, detailed description will be omitted.

As illustrated in FIG. 12, when the position of the recording medium P is within ±2 mm from the reference position (i.e., the middle point of the guide end planes of the transmitting unit 30 and the receiving unit 40), the variation of the output that depends on the stop orientation of the recording medium P is small. More specifically, if the recording medium P is conveyed so that the stop orientation thereof is within ±80% of distance from the reference position, the influence of the stop orientation of the recording medium P is small and a stable calculation output can be obtained.

From the above result, both the guide length 32 of the transmitting-side guide member 31 and the guide length 42 of the receiving-side guide member 41 are set to be an integral multiple of one-half wavelength of the ultrasonic wave emitted from the transmitting unit 30. Additionally, the recording medium P is conveyed to within ±80% of distance from the middle point between the guide end planes of the transmitting unit 30 and the receiving unit 40. Then, a stable calculation output can be obtained and the grammage detection accuracy can be enhanced.

The transmitting unit 30 and the receiving unit 40 are arranged in the straight line portion of the conveyance path in the image forming apparatus 1 illustrated in FIG. 1. This is because the recording medium at the straight line portion of the conveyance path is less affected by the variation of the stop orientation compared to a curved portion. In other words, a possibility that the stop orientation of the recording medium is within ±80% of distance from the middle point between the guide end planes of the transmitting unit 30 and the receiving unit 40 is higher at the straight line portion than at the curved portion, and thus a stable calculation output can be obtained.

Figure 13:
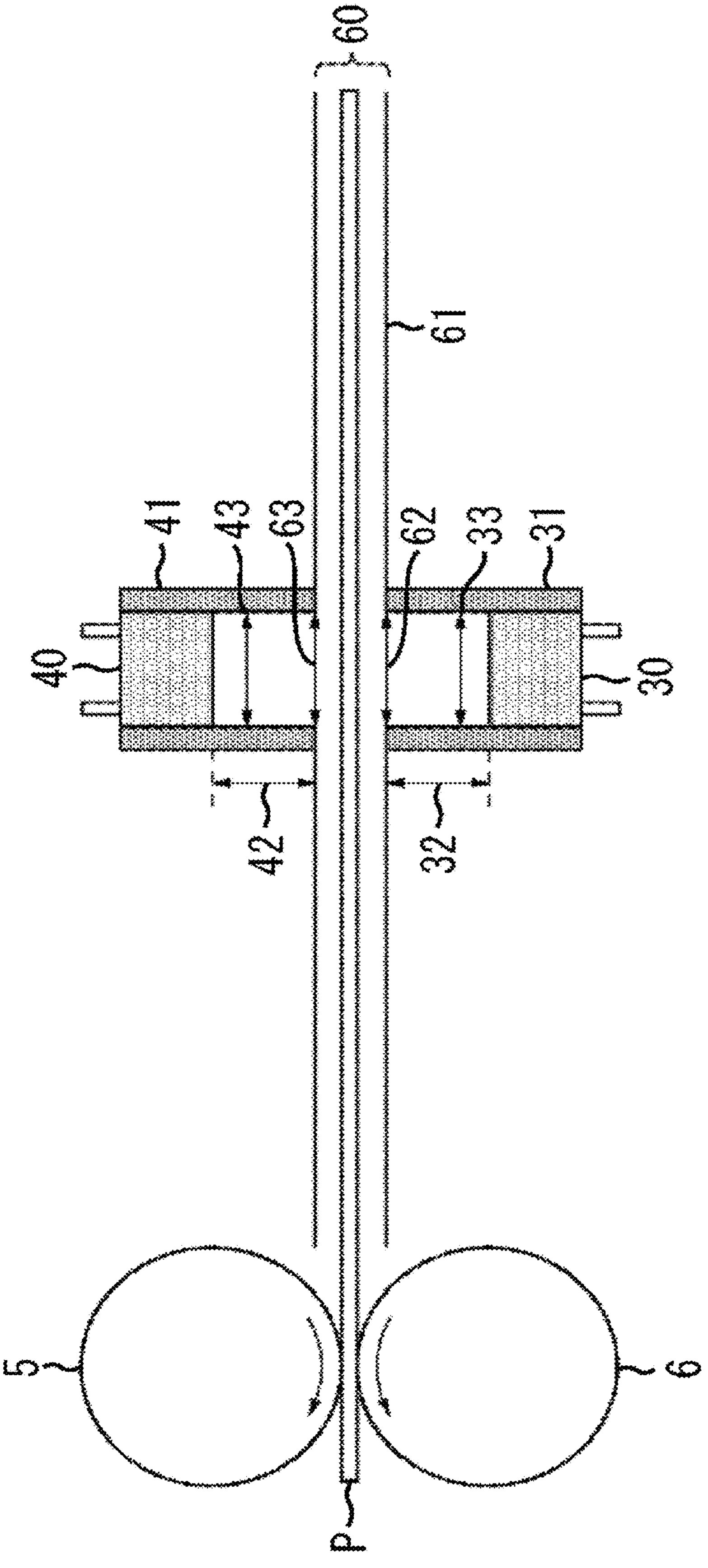
FIG. 13 illustrates a configuration of a grammage detection sensor for detecting a grammage of a recording medium according to a third exemplary embodiment of the present invention.

A third exemplary embodiment of the present invention will be described. The configuration of the grammage detection sensor according to the third exemplary embodiment is illustrated in FIG. 13. The components similar to those in the first exemplary embodiment are denoted by the same reference numerals and their description is omitted.

According to the third exemplary embodiment, the grammage detection sensor includes the transmitting unit 30 for emitting an ultrasonic wave to the recording medium P and the receiving unit 40 for receiving the ultrasonic wave emitted from the transmitting unit 30. Further, the grammage detection sensor includes the conveyance path 60 that conveys the recording medium P, the conveyance guide 61, the transmitting-side guide member 31 and the receiving-side guide member 41 which contact the conveyance guide 61, the conveyance roller 5, and the conveyance counter roller 6.

According to the present exemplary embodiment, opening diameters 33 and 43, which are width of the opening portions of the transmitting-side guide member 31 and the receiving-side guide member 41, equal opening diameters 62 and 63, which are width of opening portions of the conveyance guide 61 through which the ultrasonic wave transmits. The ends of the transmitting-side guide member 31 and the receiving-side guide member 41 contact the conveyance guide 61. In this way, the transmitting-side guide member 31 and the receiving-side guide member 41 are connected to the conveyance guide 61. Each of the guide length 32 of the transmitting-side guide member 31 and the guide length 42 of the receiving-side guide member 41 equals the distance from the vibration member 50 to the guide end plane 55 as described referring to FIG. 2, and is an integral multiple of one-half wavelength of the ultrasonic wave emitted from the transmitting unit 30.

Figure 14:
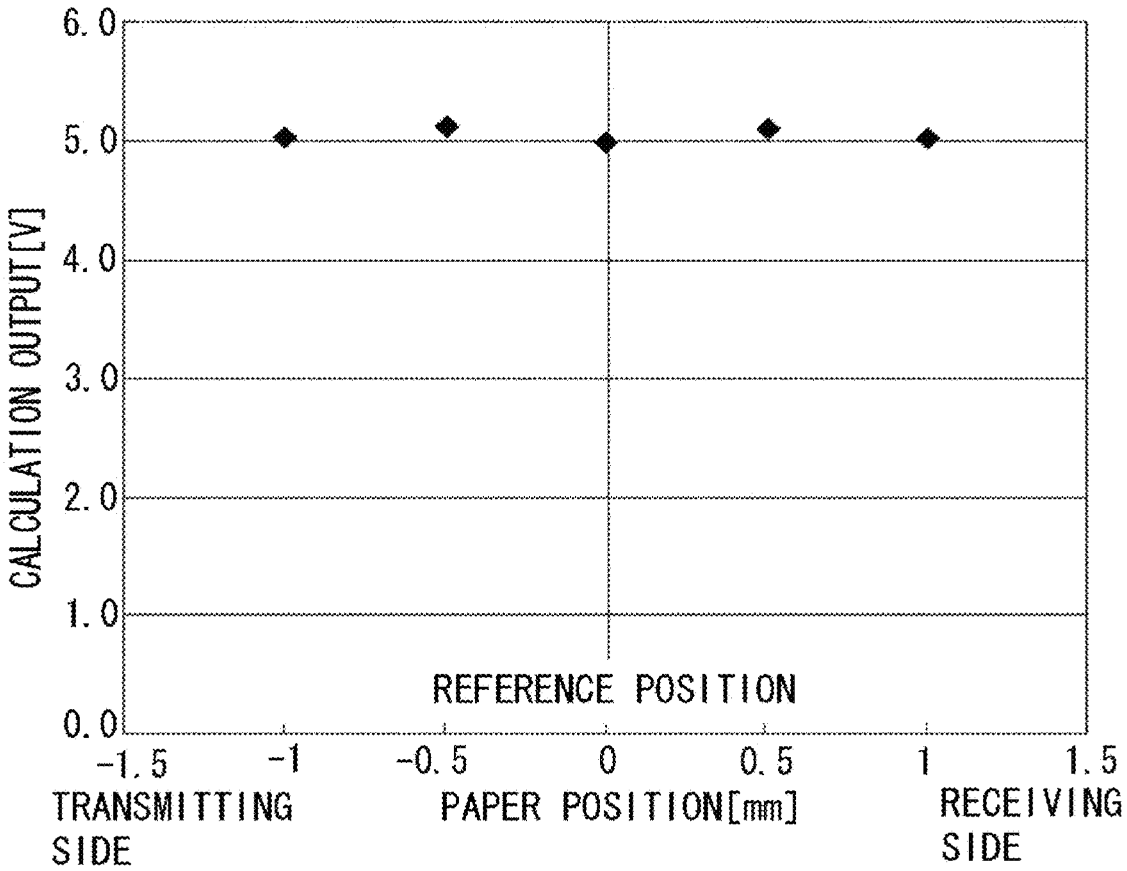
FIG. 14 illustrates a relation between a stop orientation of a recording medium and a calculation output when a guide member of the grammage detection sensor is in close contact with a conveyance guide.

FIG. 14 illustrates the calculation output when the guide length 32 of the transmitting-side guide member 31 and the guide length 42 of the receiving-side guide member 41 are fixed to one-half wavelength of the ultrasonic wave, the transmitting-side guide member 31 and the receiving-side guide member 41 contact the conveyance guide 61, and the stop orientation of the recording medium P is changed.

Since the transmitting-side guide member 31 and the receiving-side guide member 41 contact the conveyance guide 61 that conveys the recording medium P, and the opening diameters 33 and 43 of the opening portions equal the opening diameters 62 and 63 of the opening portions of the conveyance guide 61, the influence of the reflected wave from members in the periphery on the ultrasonic wave emitted from the transmitting unit 30 to the receiving unit 40 can be reduced. Thus, a stable calculation output that is not affected by the reflected wave can be obtained and the grammage detection accuracy can be improved.

A fourth exemplary embodiment of the present invention will be described. Since the configuration of the grammage detection sensor according to the present exemplary embodiment is similar to that of the first exemplary embodiment which has been described referring to FIGS. 2 and 3, detailed description of the components which are in common with the first exemplary embodiment is omitted. Difference in configuration with the first exemplary embodiment is that the guide length 32 of the transmitting-side guide member 31 is changeable and the guide length 42 of the receiving-side guide member 41 is fixed to one wavelength of the transmitted ultrasonic wave.

Figure 15:
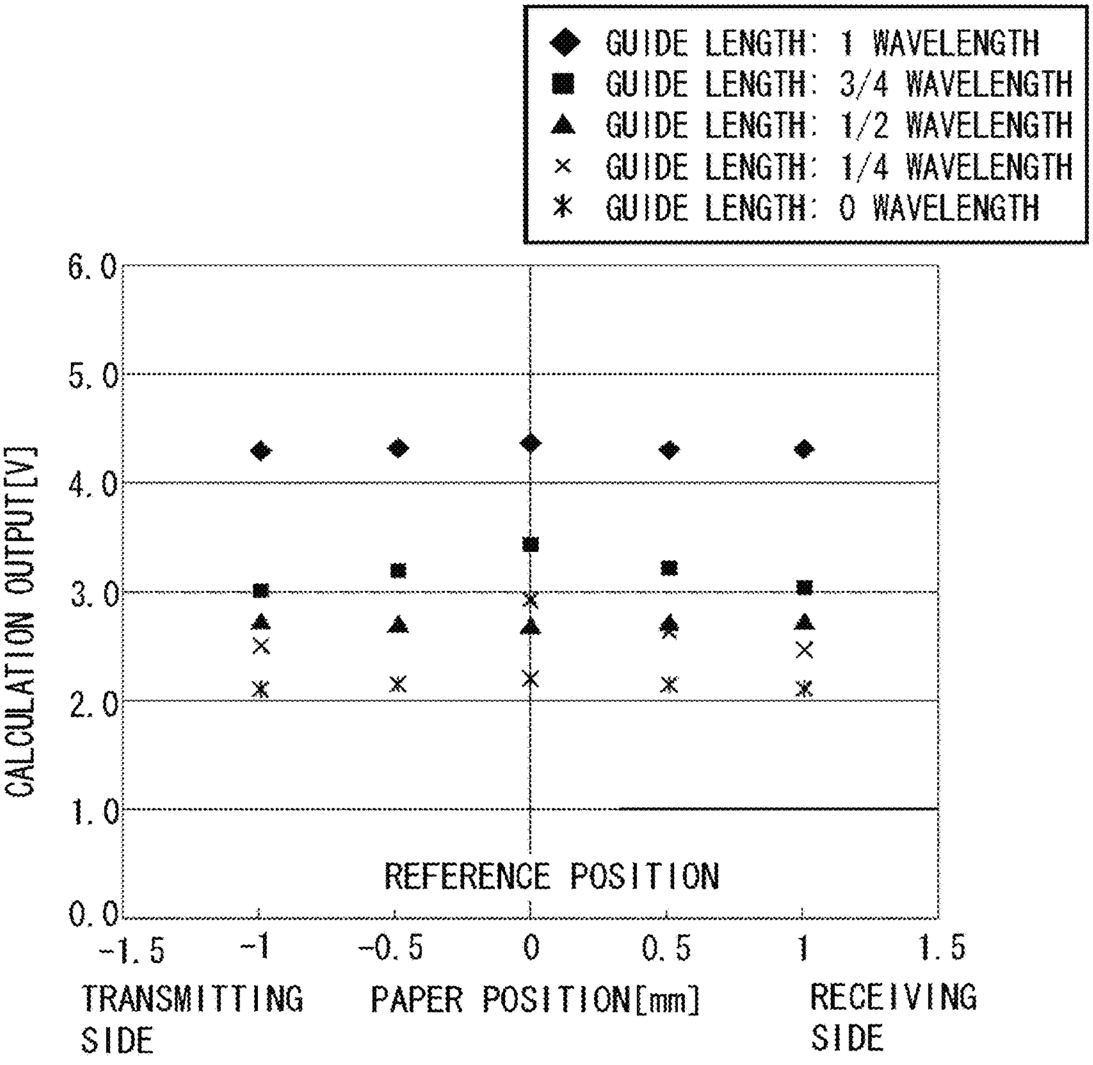
FIG. 15 illustrates a relation between a stop orientation of a recording medium and a calculation output when a distance between the ultrasonic wave receiving unit and the end plane of the guide is changed.

FIG. 15 illustrates results of the calculation output under such conditions. Since the detection conditions are in common with those described referring to FIG. 8, their description is omitted.

As illustrated in FIG. 15, when the guide length 32 of the transmitting-side guide 31 and the guide length 42 of the receiving-side guide 41 are one wavelength, the influence of the reflected wave due to the stop orientation of the recording medium P is small and the calculation output is most stable. Further, when the guide length 32 is an integral multiple of one-half wavelength, the influence of the reflected wave due to the stop orientation of the recording medium P is also small and the calculation output is stable. On the other hand, when the guide length 32 is not an integral multiple of one-half wavelength, the calculation outputs are varied and unstable by the influence of the reflected wave due to the stop orientation.

According to these results, if the guide length 32 of the transmitting-side guide 31 and the guide length 42 of the receiving-side guide 41 are integral multiples of one-half wavelength of the ultrasonic wave, stable calculation output can be obtained even when the guide length 32 and the guide length 42 are not equal. Thus, the grammage detection accuracy can be improved.

According to the present exemplary embodiment, the guide length 32 of the transmitting-side guide 31 is changed while the guide length 42 of the receiving-side guide 41 is fixed in performing the calculation output. However, the guide length 32 can be fixed while the guide length 42 is changed in detecting the calculation output. Further, both the guide length 32 and the guide length 42 can be changed in detecting the calculation output.

By setting both the guide length 32 and the guide length 42 to an integral multiple of one-half wavelength of the ultrasonic wave, the effect of the present exemplary embodiment can be obtained. Further, according to the present exemplary embodiment, both the transmitting unit 30 and the receiving unit 40 include the guide, respectively. However, the guide is not necessarily provided to the transmitting unit 30. The effect of the present exemplary embodiment can be obtained if the guide is provided to the receiving unit 40.

Figure 16:
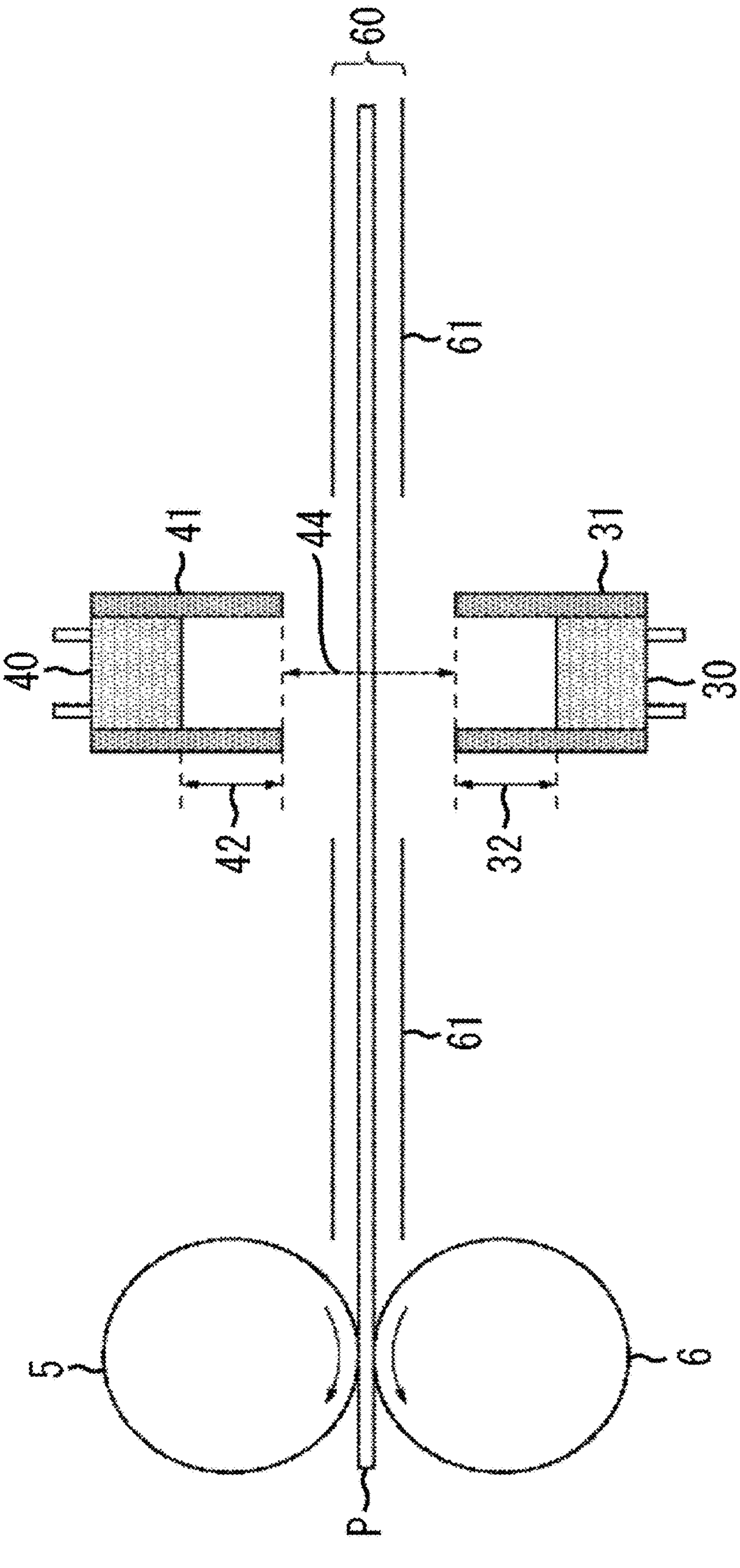
FIG. 16 illustrates a configuration of a grammage detection sensor for detecting grammage of a recording medium according to a fifth exemplary embodiment of the present invention.

A configuration of the grammage detection sensor according to a fifth exemplary embodiment is illustrated in FIG. 16. The components similar to those in the first exemplary embodiment are denoted by the same reference numerals and their description is omitted.

Figure 17:
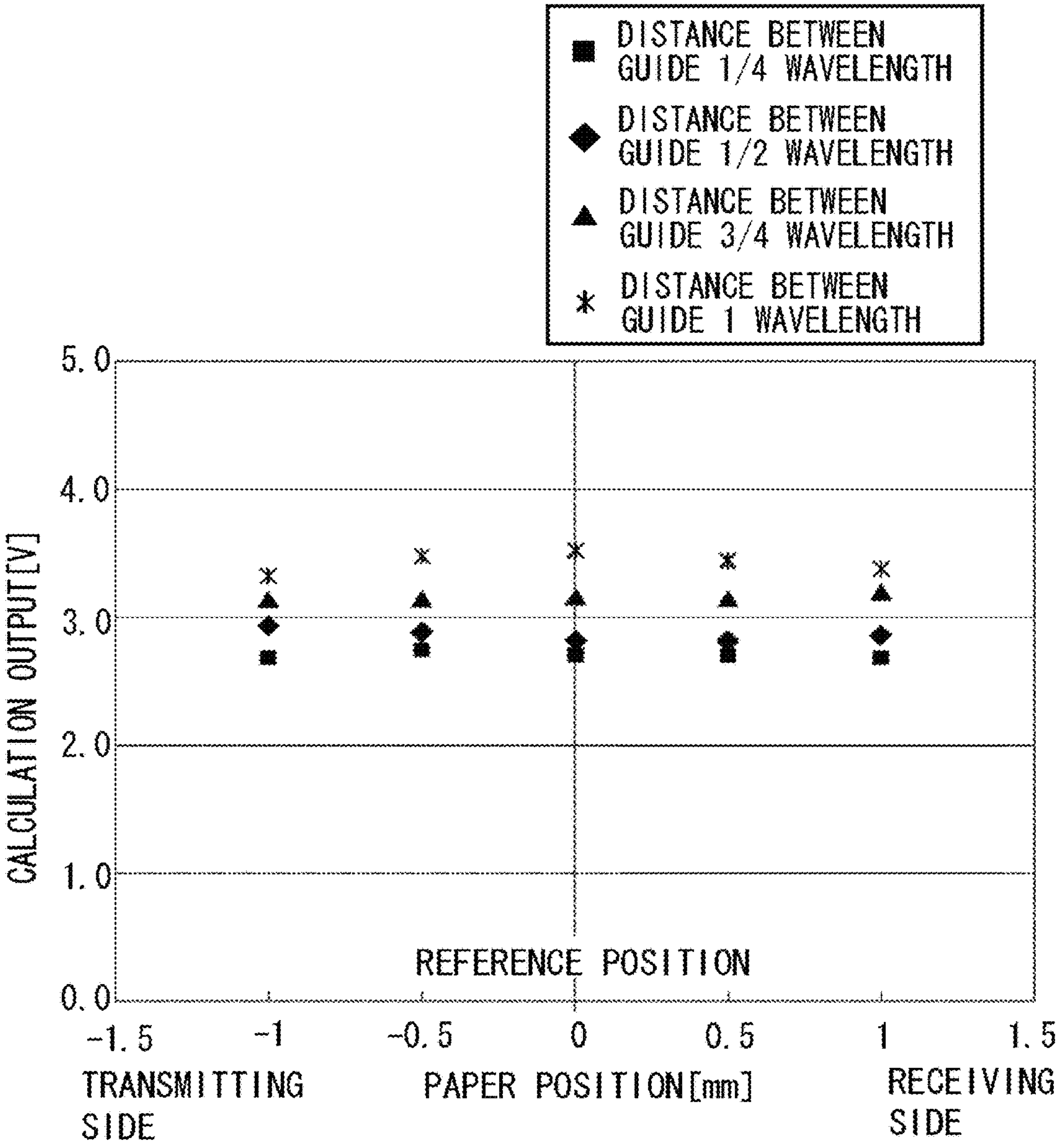
FIG. 17 illustrates a relation between a stop orientation of a recording medium and a calculation output when a guide length is fixed to one-half wavelength and a distance between the guides is changed.
Figure 18:
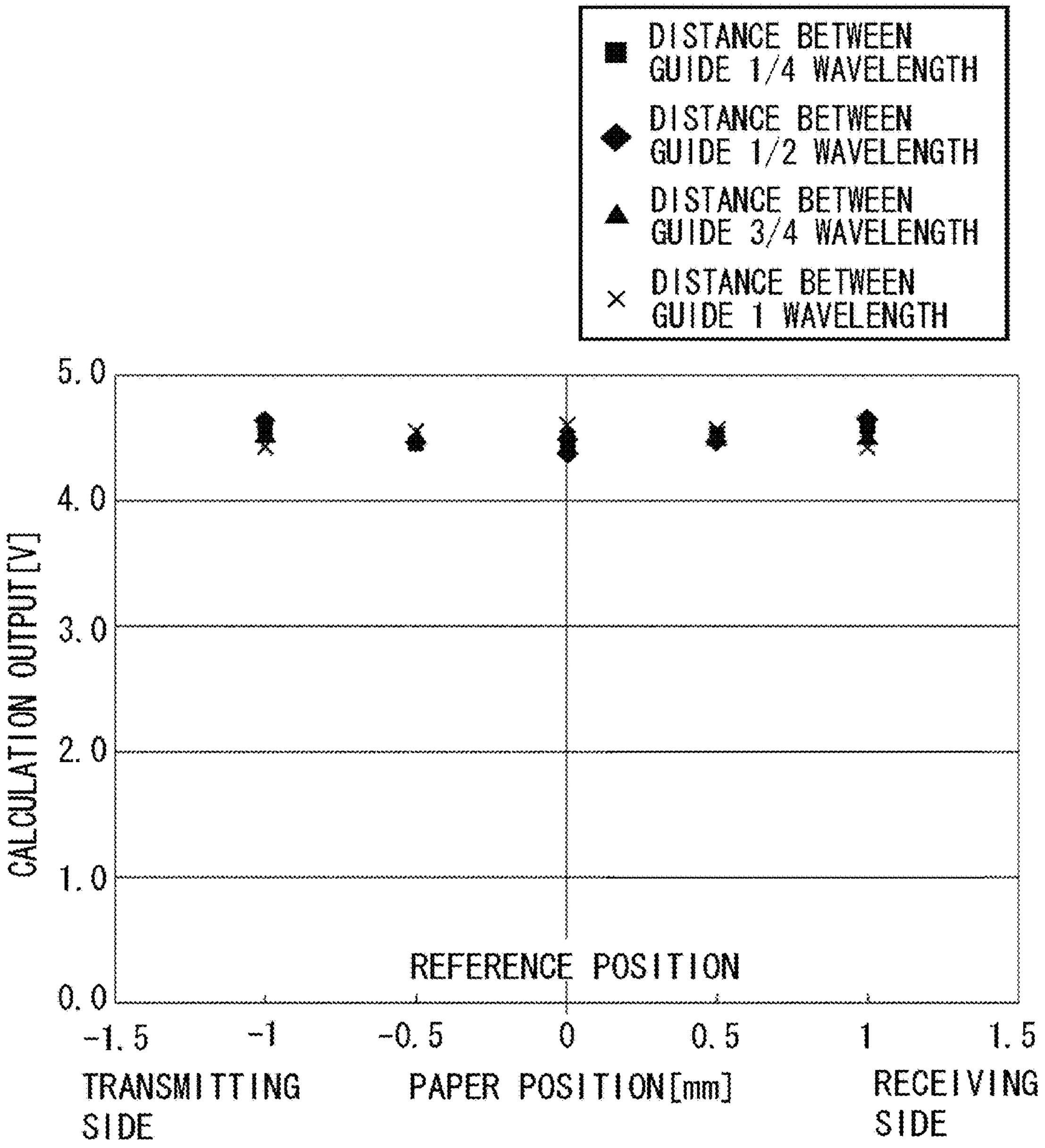
FIG. 18 illustrates a relation between a stop orientation of the recording medium and a calculation output when the guide length is fixed to one wavelength and the distance between the guides is changed.

According to the present exemplary embodiment, the guide length 32 of the transmitting-side guide 31 and the guide length 42 of the receiving-side guide 41 are fixed to one-half or one wavelength of the ultrasonic wave. A distance from the guide end plane of the transmitting unit 30 to the guide end plane of the receiving unit 40 is determined as a distance-between-guides 44. Results of the calculation output obtained by changing the distance-between-guides 44 are illustrated in FIGS. 17 and 18. Since the detection conditions are in common with those described referring to FIG. 8, their description is omitted.

FIG. 17 illustrates the calculation output obtained when the distance-between-guides 44 is changed to a plurality of conditions and the stop orientation of the recording medium P is changed in each condition of the distance-between-guides 44 while the guide lengths 32 and 42 are fixed to one-half wavelength.

The distance-between-guides 44 is set to one-quarter, one-half, three-quarter, or one wavelength of the ultrasonic wave. When the distance-between-guides 44 is one-half or one wavelength, the change in the calculation output is large and the obtained output is unstable. However, when the distance-between-guides 44 is one-quarter or three-quarter wavelength, the influence of the reflected wave due to the stop orientation of the recording medium P is small and stable calculation output is obtained.

FIG. 18 illustrates the calculation output obtained when the distance-between-guides 44 is changed to a plurality of conditions and the stop orientation of the recording medium P is changed in each condition of the distance-between-guides 44 while the guide lengths 32 and 42 are fixed to one wavelength.

The distance-between-guides 44 is set to one-quarter, one-half, three-quarter, or one wavelength of the ultrasonic wave. Similar to the above described case where the guide length 32 and the guide length 42 are fixed to one-half wavelength, when the distance-between-guides 44 is one-quarter or three-quarter wavelength, the influence of the reflected wave due to the stop orientation of the recording medium P is small and stable calculation output is obtained. That is, the distance-between-guides 44 can be obtained by $\lambda/4 \times m$ (m is an odd number of one or greater).

Next, a reason why setting the distance-between-guides 44 in multiples of m (hereinafter referred to as odd multiple) of one-quarter wavelength of the ultrasonic wave is effective in obtaining a stable output result will be described referring to FIGS. 19A, 19B, 20A, 20B, 21A, 21B, 22A, and 22B.

Figure 19A:
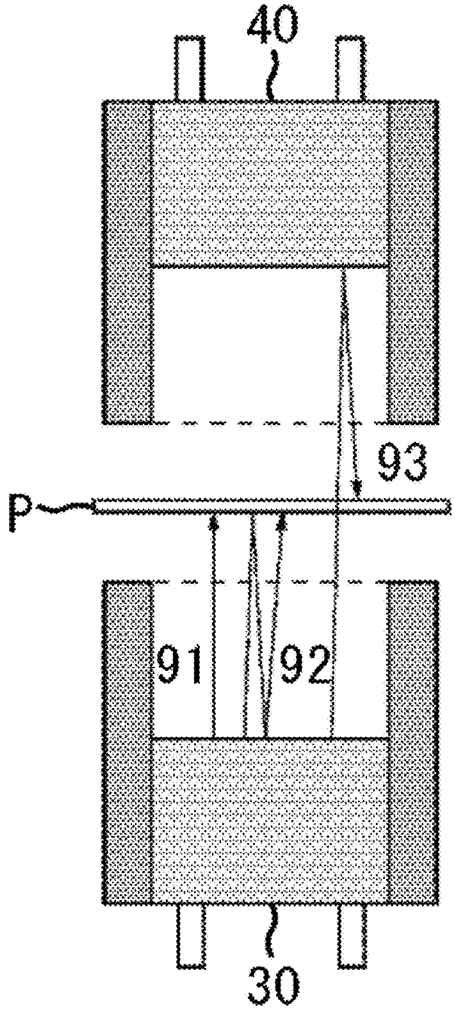
FIGS. 19A and 19B illustrate a path of an ultrasonic wave that is emitted from the transmitting unit and a path of a reflected wave from various members when the distance between the guides is set to three-quarter wavelength.
Figure 19B:
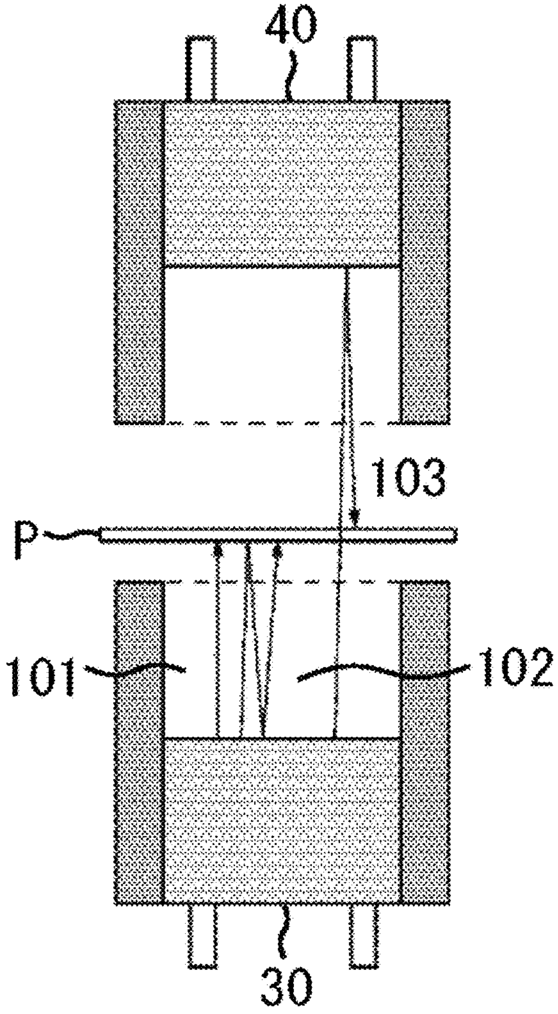

FIGS. 19A and 19B illustrate propagation paths of the ultrasonic wave emitted from the transmitting unit 30 and the wave reflected from the recording medium P. Along paths 91 and 101, the ultrasonic wave is directly propagated from the transmitting unit 30 to the recording medium P. Along paths 92 and 102, the ultrasonic wave is emitted from the transmitting unit 30, reflected by the recording medium P, reflected again by the transmitting unit 30, and finally reaches to the recording medium P. Along paths 93 and 103, the ultrasonic wave is emitted from the transmitting unit 30, transmits through the recording medium P, is reflected by the receiving unit 40, and reaches again to the recording medium P.

In FIGS. 19A and 19B, the guide lengths 32 and 42 are one-half wavelength and the distance-between-guides 44 is three-quarter wavelength. In FIG. 19A, the recording medium P is stopped at the intermediate point between the guide end plane of the transmitting unit and the guide end plane of the receiving unit (hereinafter referred to as an intermediate point between planes). In FIG. 19B, the recording medium P is stopped at a point closer to the transmitting unit with respect to the intermediate point between planes.

Figure 20A:
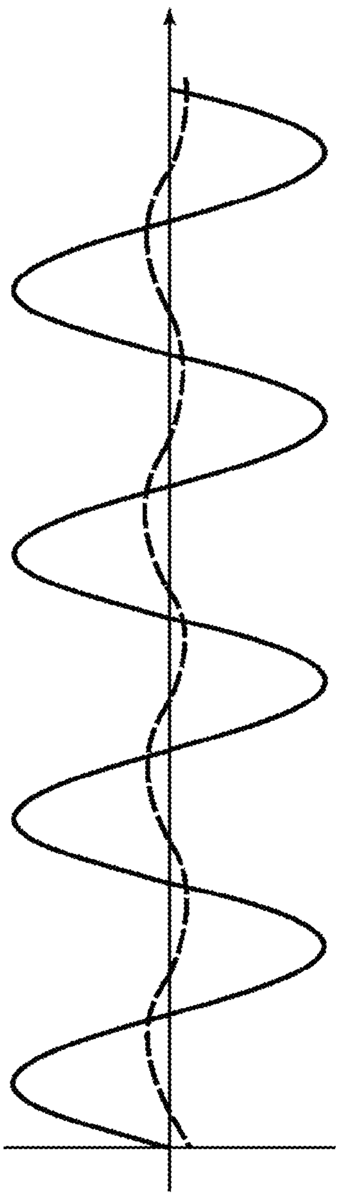
FIGS. 20A and 20B are waveforms of the ultrasonic wave that pass through each path illustrated in FIGS. 19A and 19B.

First, interference of the ultrasonic wave in the state illustrated in FIG. 19A will be described. The path difference between the paths 91 and 92 is seven-quarter wavelength since the distance from the guide end plane to the recording medium P is three-eighth wavelength and the guide length is one-half wavelength. Similarly, the path difference between the paths 91 and 93 is seven-quarter wavelength. Thus, the ultrasonic waves of the paths 92 and 93 are seven-quarter wavelength delayed from the ultrasonic wave of the path 91. The waveforms of the ultrasonic waves that propagate along the paths and reach the recording medium P are illustrated in FIG. 20A. In FIG. 20A, the ultrasonic waves of the paths 91, 92, and 93 in FIG. 19A are represented as the ultrasonic waves of the paths 1, 2, and 3, respectively.

Considering a synthesized wave of each ultrasonic wave, although the ultrasonic waves of the paths 92 and 93 are in phase, they are one-quarter wavelength out of phase with the ultrasonic wave emitted from the transmitting unit 30. However, since the ultrasonic waves of the paths 92 and 93 are reflected waves of the ultrasonic wave that is emitted from the transmitting unit 30, they are attenuated compared to the ultrasonic wave of the path 91. Thus, although the ultrasonic waves of the paths 92 and 93 are not in phase with the ultrasonic wave emitted from the transmitting unit 30, the phase difference is in an allowable range for obtaining a stable calculation output. Since the ultrasonic waves of the paths 92 and 93 are in phase, in FIG. 20A, the waveform represented by a long dashed line indicates that the waveforms of the ultrasonic waves of the paths 92 and 93 overlap each other.

Next, the interference of the ultrasonic wave in the state illustrated in FIG. 19B will be described. In FIG. 19B, the recording medium P is stopped one-eighth wavelength closer to the transmitting unit 30 with respect to the intermediate point between planes.

Figure 20B:
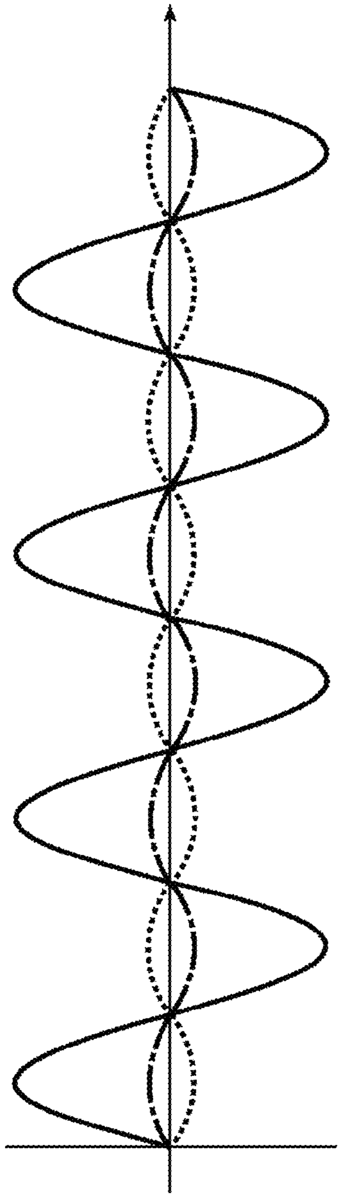

Since the path difference between the paths 101 and 102 is three-half wavelength, the ultrasonic wave of the path 102 is delayed three-half wavelength from the ultrasonic wave of the path 101. Similarly, since the path difference between the paths 101 and 103 is two wavelengths, the ultrasonic wave of the path 103 is delayed two wavelengths from the ultrasonic wave of the path 101. The waveforms of the ultrasonic waves that propagate along the paths and reach the recording medium P are illustrated in FIG. 20B. In FIG. 20B, the ultrasonic waves of the paths 101, 102, and 103 in FIG. 19B are represented as the ultrasonic waves of the paths 1, 2, and 3, respectively.

Considering a synthesized wave of each ultrasonic wave, the ultrasonic waves of the paths 101 and 103 are in phase, but the ultrasonic wave of the path 102 is in an opposite phase. Although the ultrasonic wave of the path 102 is in the opposite phase, since the ultrasonic waves of the paths 102 and 103 are reflected waves of the ultrasonic wave that is emitted from the transmitting unit 30, they are attenuated compared to the ultrasonic wave of the path 101. Thus, the ultrasonic waves of the paths 102 and 103 substantially cancel each other, and the state of the synthesized wave becomes stable. Further, although not illustrated, when the ultrasonic waves of the paths 101 and 102 are in phase, since the ultrasonic wave of the path 103 will be in an opposite phase with the ultrasonic waves of the paths 101 and 102. Thus, the ultrasonic wave of the path 102 and the ultrasonic wave of the path 103 cancel each other, and the state of the synthesized wave also becomes stable.

Figure 21A:
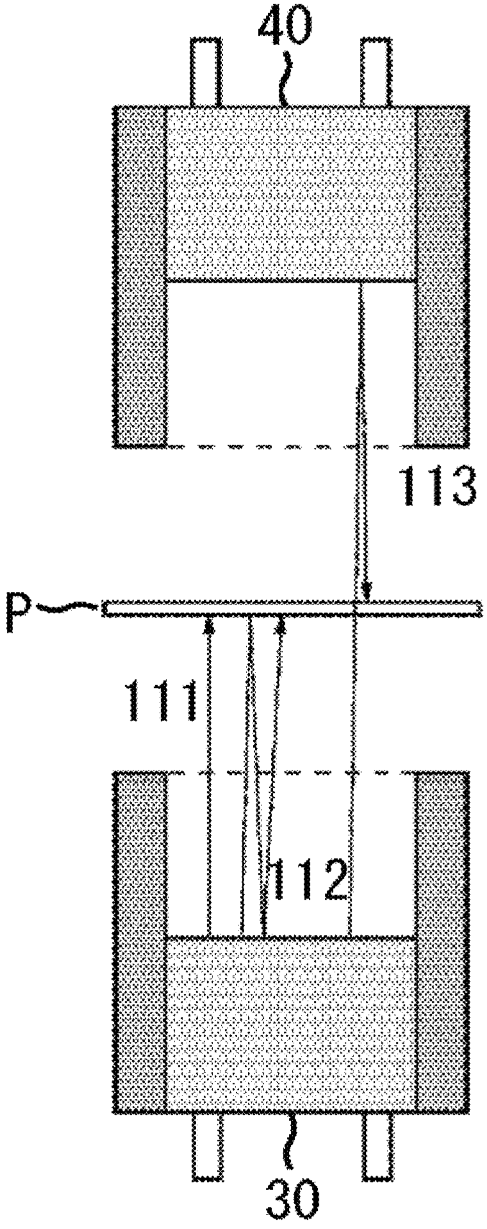
FIGS. 21A and 21B illustrate a path of an ultrasonic wave that is emitted from the transmitting unit and a path of a reflected wave from various members when the distance between the guides is set to one wavelength.
Figure 21B:
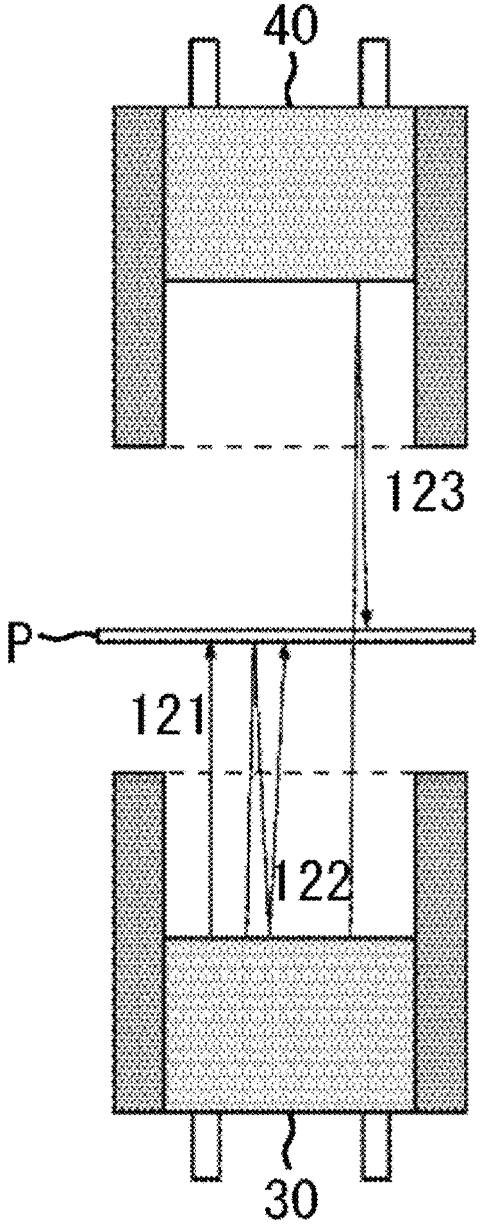
Figures 22A, 22B:
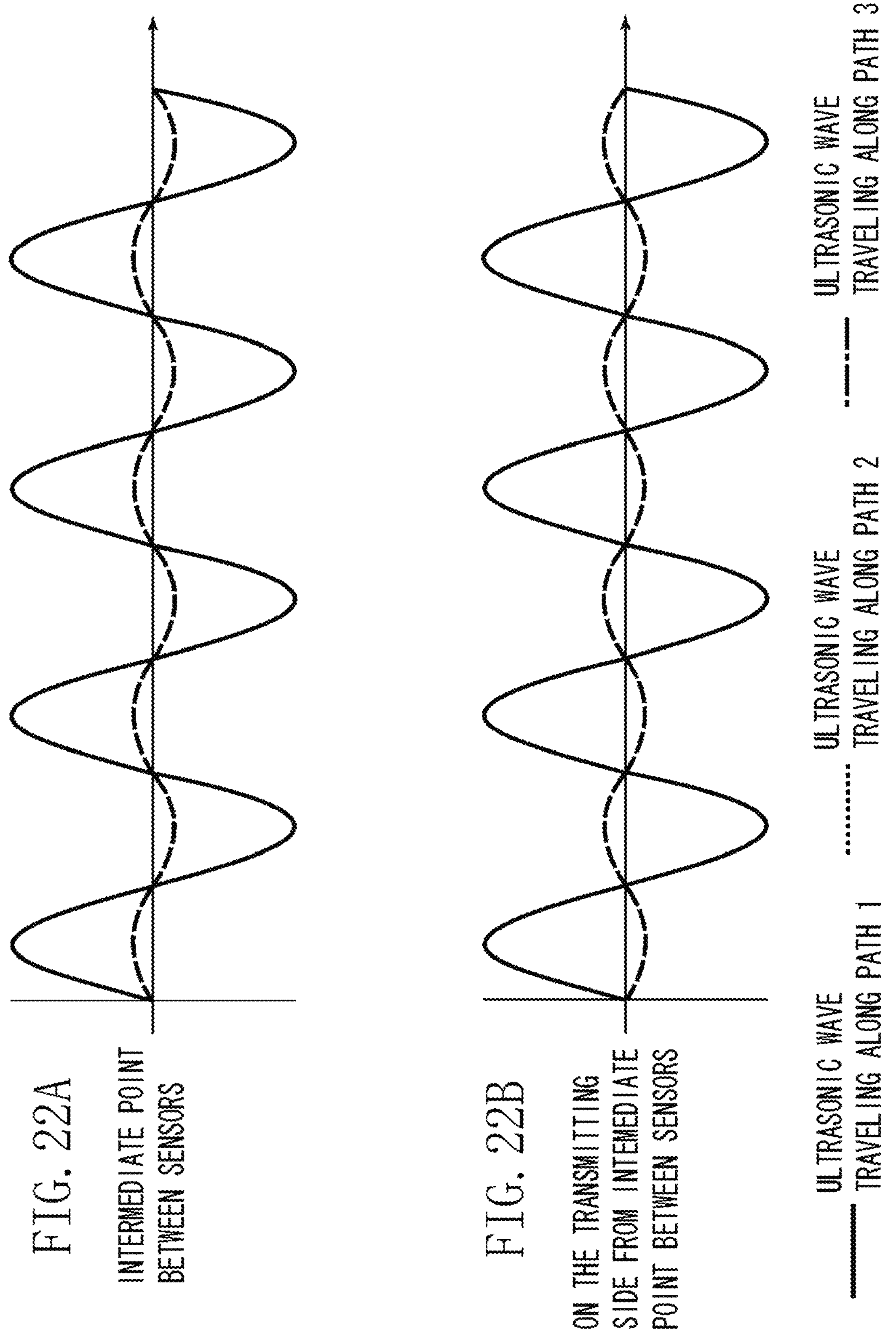
FIGS. 22A and 22B are waveforms of the ultrasonic wave that pass through each path illustrated in FIGS. 21A and 21B.

Next, the state of the ultrasonic wave of each path when the distance between the guides is one wavelength will be described referring to FIGS. 21A and 21B. First, interference of the ultrasonic wave in the state of FIG. 21A will be described. If the recording medium P is stopped in the stop orientation at the intermediate point between planes as illustrated in FIG. 21A, the path difference between the paths 111 and 112 will be two wavelengths since the distance from the guide end plane to the recording medium P is one-half wavelength and the guide length is one-half wavelength. Similarly, the path difference between the paths 111 and 113 will be two wavelengths. The waveforms of the ultrasonic waves that propagate along the paths and reach the recording medium P are illustrated in FIG. 22A. In FIG. 22A, the ultrasonic waves of the paths 111, 112, and 113 in FIG. 21A are represented as the ultrasonic waves of the paths 1, 2, and 3, respectively. As illustrated in FIG. 22A, since the ultrasonic waves of all paths are in the same phase, the output of the synthesized wave is maximized. Since the ultrasonic waves of the paths 112 and 113 are in phase, in FIG. 22A, the waveform represented by a long dashed line indicates that the waveforms of the ultrasonic waves of the paths 112 and 113 overlap each other.

Next, the interference of the ultrasonic wave in the state illustrated in FIG. 21B will be described. In FIG. 21B, the recording medium P is stopped one-quarter wavelength closer to the transmitting unit 30 with respect to the intermediate point between planes.

The path difference between the paths 121 and 122 is three-half wavelength since the distance from the guide end plane of the transmitting unit 30 to the recording medium P is one-quarter wavelength and the guide length is one-half wavelength, and the ultrasonic wave of the path 122 is delayed three-half wavelength from the ultrasonic wave of the path 121. Further, since the difference between the paths 121 and 123 is five-half wavelength as the distance from the guide end plane of the receiving unit 40 to the recording medium P is three-quarter wavelength and the guide length is one-half wavelength, the ultrasonic wave of the path 123 is delayed five-half wavelength from the ultrasonic wave of the path 121.

The waveforms of the ultrasonic waves that propagate along the paths and reach the recording medium P are illustrated in FIG. 22B. In FIG. 22B, the ultrasonic waves of the paths 121, 122, and 123 in FIG. 21B are represented as the ultrasonic waves of the paths 1, 2, and 3, respectively. Since the ultrasonic waves of the paths 122 and path 123 are synthesized in opposite phase with the ultrasonic wave of the path 121 as illustrated in FIG. 22B, the output of the synthesized wave is minimized. Since the ultrasonic waves of the paths 122 and 123 are in phase, in FIG. 22A, the waveform represented by a long dashed line indicates the overlapped waveform of the ultrasonic waves of the paths 122 and 123.

If the distance between guides is not an odd multiple of one-quarter wavelength, the output of the synthesized wave can be a maximum value or a minimum value depending on a position of the recording medium P. Large variation of the output values causes the calculation output to become unstable. However, if the distance-between-guides 44 is set to an odd multiple of one-quarter wavelength, an ultrasonic wave of a different phase is emitted to each path according to the position of the recording medium P. Further, large variation, for example, all of the reflected waves are in phase with or out of phase with the ultrasonic wave that is emitted from the transmitting unit 30, does not occur, and thus stable calculation output with small variation can be obtained.

In other words, if the guide length is an integral multiple of one-half wavelength, and further, if the distance between the guides is an odd multiple of one-quarter wavelength, the variation of the output due to the stop orientation of the recording medium P will be small and a stable output result can be obtained. Thus, the grammage detection accuracy of the recording medium P can be improved. The above-described conditions are examples, and if the distance-between-guides 44 is multiples of m (m is an odd number of one or greater) of one-quarter wavelength of the ultrasonic wave, then a similar result can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-155361 filed Jun. 13, 2008 and Japanese Patent Application No. 2009-109394 filed Apr. 28, 2009, which are hereby incorporated by reference herein in their entirety.

What is claimed is:

1. A grammage detection sensor which detects a grammage of a recording medium using an ultrasonic wave, the grammage detection sensor comprising:

a transmitting unit configured to transmit the ultrasonic wave; and a receiving unit including a first vibration member configured to receive the ultrasonic wave that is transmitted from the transmitting unit and passes through the recording medium, wherein the receiving unit includes a guide member configured to guide the ultrasonic wave that passes through the recording medium to the first vibration member, and wherein a length from a surface of the first vibration member to a plane including an end plane of the guide member along a line that passes through a center of the first vibration member and is perpendicular to the first vibration member is approximately n times of one-half wavelength of the ultrasonic wave transmitted from the transmitting unit, and n is an integer of one or greater.

2. The grammage detection sensor according to claim 1, wherein the transmitting unit includes a second vibration member configured to transmit the ultrasonic wave, the transmitting unit includes a guide member configured to guide the transmitted ultrasonic wave to the receiving unit, and wherein a length from a surface of the second vibration member to a plane including an end plane of the guide member along a line that passes through a center of the second vibration member and is perpendicular to the second vibration member is approximately n times of one-half wavelength of the ultrasonic wave transmitted from the transmitting unit, and n is an integer of one or greater.

3. The grammage detection sensor according to claim 1, wherein the length of the approximately n times of one-half wavelength of the ultrasonic wave is set so that an output range of a signal output by receiving the ultrasonic wave that passes through a recording medium of a first grammage by the receiving unit and an output range of a signal output by receiving the ultrasonic wave that passes through a recording medium of a second grammage by the receiving unit do not overlap.

4. The grammage detection sensor according to claim 3, wherein the first grammage is 105 g/m$^2$ and the second grammage is 120 g/m$^2$.

5. The grammage detection sensor according to claim 2, wherein a distance between the end plane of the guide member of the transmitting unit to the end plane of the guide member of the receiving unit is approximately m times of one-fourth wavelength of the ultrasonic wave transmitted from the transmitting unit, and m is an odd number of one or greater.

6. A grammage detection sensor which detects a grammage of a recording medium using an ultrasonic wave, the grammage detection sensor comprising:

a transmitting unit configured to transmit the ultrasonic wave; and a receiving unit including a first vibration member configured to receive the ultrasonic wave that is transmitted from the transmitting unit and passes through the recording medium, wherein the receiving unit includes a guide member configured to guide the ultrasonic wave that passes through the recording medium to the first vibration member, and wherein a length from a surface of the first vibration member to a plane including an end plane of the guide member along a line that passes through a center of the first vibration member and is perpendicular to the first vibration member is set so that an output range of a signal output by receiving the ultrasonic wave that passes through a recording medium of a first grammage by the first vibration member and an output range of a signal output by receiving the ultrasonic wave that passes through a recording medium of a second grammage by the first vibration member do not overlap.

7. The grammage detection sensor according to claim 6, wherein the transmitting unit includes a second vibration member configured to transmit the ultrasonic wave, the transmitting unit includes a guide member configured to guide the transmitted ultrasonic wave to the receiving unit, and wherein a length from a surface of the second vibration member to a plane including an end plane of the guide member along a line that passes through a center of the second vibration member and is perpendicular to the second vibration member is set so that an output range of a signal output by receiving the ultrasonic wave that passes through the recording medium of the first grammage by the receiving unit and an output range of a signal output by receiving the ultrasonic wave that passes through the recording medium of the second grammage by the receiving unit do not overlap.

8. An image forming apparatus which forms an image on a recording medium, the image forming apparatus comprising:

an image forming unit configured to form the image;

a transmitting unit configured to transmit an ultrasonic wave;

a receiving unit including a first vibration member configured to receive the ultrasonic wave that is transmitted from the transmitting unit and passes through the recording medium; and a control unit configured to control an image forming condition of the image forming unit according to the ultrasonic wave received by the receiving unit, wherein the receiving unit includes a guide member configured to guide the ultrasonic wave that passes through the recording medium to the first vibration member, and wherein a length from a surface of the first vibration member to a plane including an end plane of the guide member along a line that passes through a center of the first vibration member and is perpendicular to the first vibration member is approximately n times of one-half wavelength of the ultrasonic wave transmitted from the transmitting unit, and n is an integer of one or greater.

9. The image forming apparatus according to claim 8, wherein the transmitting unit includes a second vibration member configured to transmit the ultrasonic wave, the transmitting unit includes a guide member configured to guide the transmitted ultrasonic wave to the receiving unit, and a length from a surface of the second vibration member to a plane including an end plane of the guide member along a line that passes through a center of the second vibration member and is perpendicular to the second vibration member is approximately n times of one-half wavelength of the ultrasonic wave transmitted from the transmitting unit, and n being an integer of one or greater.

10. The image forming apparatus according to claim 8, wherein the image forming apparatus detects a grammage of the recording medium according to an output result of the receiving unit, and the length of the approximately n times of one-half wavelength of the ultrasonic wave is set so that an output range of a signal output by receiving the ultrasonic wave that passes through a recording medium of a first grammage by the first vibration member and an output range of a signal output by receiving the ultrasonic wave that passes through a recording medium of a second grammage by the first vibration member do not overlap.

11. The image forming apparatus according to claim 10, wherein the first grammage is 105 g/$m^2$ and the second grammage is 120 g/$m^2$.

12. The image forming apparatus according to claim 9, further comprising:

a conveyance guide configured to convey the recording medium, wherein the conveyance guide includes an opening portion through which the receiving unit receives the ultrasonic wave transmitted from the transmitting unit, and the end of the guide member is in close contact with the opening portion of the conveyance guide.

13. The image forming apparatus according to claim 9, wherein a distance between the end plane of the guide member of the transmitting unit to the end plane of the guide member of the receiving unit is approximately m times of one-fourth wavelength of the ultrasonic wave transmitted from the transmitting unit, and m is an odd number of one or greater.

14. An image forming apparatus which forms an image on a recording medium, the image forming apparatus comprising:

an image forming unit configured to form the image;

a transmitting unit configured to transmit an ultrasonic wave;

a receiving unit including a first vibration member configured to receive the ultrasonic wave that is transmitted from the transmitting unit and passes through the recording medium; and a control unit configured to control an image forming condition of the image forming unit according to an output result of the receiving unit, wherein the receiving unit includes a guide member configured to guide the ultrasonic wave that passes through the recording medium to the first vibration member, and wherein a length from a surface of the first vibration member to a plane including an end plane of the guide member along a line that passes through a center of the first vibration member and is perpendicular to the first vibration member is set so that an output range of a signal output by receiving the ultrasonic wave that passes through a recording medium of a first grammage by the receiving unit and an output range of a signal output by receiving the ultrasonic wave that passes through a recording medium of a second grammage by the receiving unit do not overlap.

15. The image forming apparatus according to claim 14, wherein the transmitting unit includes a second vibration member configured to transmit the ultrasonic wave, the transmitting unit includes a guide member configured to guide the transmitted ultrasonic wave to the receiving unit, and wherein a length from a surface of the second vibration member to a plane including an end plane of the guide member along a line that passes through a center of the second vibration member and is perpendicular to the second vibration member is set so that the output range of a signal output by receiving the ultrasonic wave that passes through the recording medium of the first grammage by the receiving unit and the output range of a signal output by receiving the ultrasonic wave that passes through the recording medium of the second grammage by the receiving unit do not overlap.

* * * * *